(12) United States Patent
Liu et al.

(10) Patent No.: US 11,403,292 B2
(45) Date of Patent: Aug. 2, 2022

(54) QUERY MODIFICATION ASSISTANCE SYSTEM, SEARCH SYSTEM, AND COMPUTER READABLE MEDIUM

(71) Applicant: FUJIFILM BUSINESS INNOVATION CORP., Tokyo (JP)

(72) Inventors: Yang Liu, Yokohama (JP); Shintaro Adachi, Yokohama (JP); Akinobu Yamaguchi, Yokohama (JP); Daigo Horie, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 129 days.

(21) Appl. No.: 16/843,248

(22) Filed: Apr. 8, 2020

(65) Prior Publication Data
US 2021/0117421 A1   Apr. 22, 2021

(30) Foreign Application Priority Data
Oct. 18, 2019   (JP) .............................. JP2019-191529

(51) Int. Cl.
*G06F 7/00* (2006.01)
*G06F 16/2453* (2019.01)
*G06F 16/532* (2019.01)
*G06F 16/953* (2019.01)
*G06F 16/248* (2019.01)

(52) U.S. Cl.
CPC ...... *G06F 16/24534* (2019.01); *G06F 16/248* (2019.01); *G06F 16/532* (2019.01); *G06F 16/953* (2019.01)

(58) Field of Classification Search
CPC ............. G06F 16/24534; G06F 16/953; G06F 16/532; G06F 16/248; G06F 16/5854; G06F 16/535; G06F 16/538; G06F 3/0482; G06F 3/04845; G06F 3/04842; G06K 9/00671; G06K 9/2081
See application file for complete search history.

(56) References Cited

U.S. PATENT DOCUMENTS

| 10,109,051 B1* | 10/2018 | Natesh ................. G06K 9/4652 |
| 2007/0077025 A1 | 4/2007 | Mino |
| 2010/0029326 A1* | 2/2010 | Bergstrom ......... H04N 1/00307 |
| | | 455/556.1 |
| 2013/0101218 A1 | 4/2013 | Mino |
| 2014/0089295 A1 | 3/2014 | Becherer et al. |

(Continued)

FOREIGN PATENT DOCUMENTS

| EP | 3591544 A1 | 1/2020 |
| JP | 2006-227994 A | 8/2006 |

(Continued)

OTHER PUBLICATIONS

Mar. 29, 2021 Office Action issued in Australian Patent Application No. 2020203176.

*Primary Examiner* — Mohammad A Sana
(74) *Attorney, Agent, or Firm* — Oliff PLC

(57) ABSTRACT

A query modification assistance system includes: a processor configured to present, in a case where at least a part of an image used as a query that is to be provided to a search engine is designated as a target to be modified, assist information for assisting a modification according to at least one condition relating to the target, to a user.

14 Claims, 19 Drawing Sheets

(56) References Cited

U.S. PATENT DOCUMENTS

| | | | |
|---|---|---|---|
| 2015/0049091 A1* | 2/2015 | Nachman | G06F 16/5854 |
| | | | 345/467 |
| 2016/0098613 A1 | 4/2016 | Mino | |
| 2016/0161964 A1* | 6/2016 | Sato | G06Q 10/00 |
| | | | 700/297 |
| 2018/0068474 A1* | 3/2018 | Mowatt | G06F 3/04815 |
| 2018/0129898 A1 | 5/2018 | Mino | |
| 2019/0370547 A1 | 12/2019 | Lee et al. | |
| 2020/0356591 A1* | 11/2020 | Yada | G06F 16/532 |

FOREIGN PATENT DOCUMENTS

| | | |
|---|---|---|
| JP | 2007-122694 A | 5/2007 |
| JP | 2009-027393 A | 2/2009 |
| JP | 5009577 B2 | 8/2012 |
| JP | 2018-142160 A | 9/2018 |
| WO | 2018/135750 A1 | 7/2018 |

\* cited by examiner

FIG. 4

| INPUT INFORMATION | EXAMPLES |
|---|---|
| PREMISE INFORMATION | ADDRESS, LAND INFORMATION, PROPERTY TYPE, BUDGET, EXISTENCE OR NON-EXISTENCE OF GARDEN, EXISTENCE OR NON-EXISTENCE OF GARAGE, FAMILY STRUCTURE, THE NUMBER OF FAMILIES, ETC … |
| IMAGE INFORMATION | HAND-DRAWN PICTURES, PHOTOGRAPHS, LEAFLETS, CG, ETC … |
| STRUCTURAL INFORMATION TEXT | TWO-FAMILY HOUSE, 10 MINUTES WALKING DISTANCE, THREE ROOMS AND ONE LIVING ROOM WITH DINING ROOM-KITCHEN AREA, WOODEN HOUSE, ETC … |
| EMOTIONAL INFORMATION TEXT | OPENNESS, FAMILY GATHERING, JAPANESE STYLE SPACE, WARMTH OF WOOD, ETC … |

FIG. 5
CATEGORY: LIVING ROOM
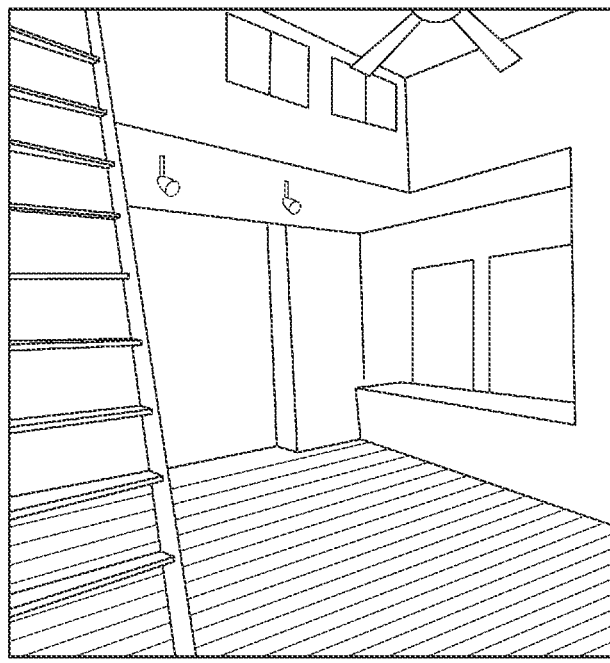
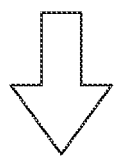 FEATURE EXTRACTION
HIGH CEILING
HIGH WINDOW
LADDER
FLOORING
WARMTH OF WOOD
OPEN
CEILING FAN
SPOT LIGHT
...

FIG. 11

THE WINDOW WILL BE USED IN THE LIVING ROOM, AND CONSTRAINTS RELATED TO WINDOWS FOR LIVING ROOMS INCLUDE ARTICLE 2(4) OF THE BUILDING STANDARDS ACT — 212

210 ↓

| SELECTED PARTS | DELETION | | ATTRIBUTE NAME | MODIFIABLE ATTRIBUTE | | | |
|---|---|---|---|---|---|---|---|
| | POSSIBILITY | REASON | | RANGE (UPPER LIMIT/LOWER LIMIT) | REASON | RECOMMENDATION | REASON |
| WINDOW FOR LIVING ROOM | IMPOSSIBLE | | POSITION ON WALL | HEIGHT OF a1 cm FROM FLOOR  DISTANCE OF b1 cm TO CEILING  DISTANCE OF c1 cm TO LEFT WALL  DISTANCE OF d1 cm TO RIGHT WALL | FOR STRENGTH, THE LEVEL OF DIFFICULTY IN CONSTRUCTION, EASE OF OPENING AND CLOSING, SECURITY (FOR CHILDREN), ELECTRICAL WIRING, VENTILATION, FURNITURE ARRANGEMENT, NEIGHBORHOOD, ETC | HEIGHT OF a2 cm FROM FLOOR  DISTANCE OF b2 cm TO CEILING  DISTANCE OF c2 cm TO LEFT WALL  DISTANCE OF d2 cm TO RIGHT WALL | THEY ARE RECOMMENDED IN CONSIDERATION OF STRENGTH, COST, CONVENIENCE, SECURITY, AND THE INFLUENCE ON OTHERS, AND THE COMPANY HAS MANY ACHIEVEMENTS USING THEM |
| | | | WINDOW SIZE | NATURAL LIGHTING: THE AREA EFFECTIVE FOR NATURAL LIGHTING, I.E. AT LEAST 1/7 OF THE FLOOR AREA IN THE LIVING ROOM IS REQUIRED  VENTILATION: THE AREA EFFECTIVE FOR VENTILATION, I.E. AT LEAST 1/20 OF THE FLOOR AREA IN THE LIVING ROOM IS REQUIRED  FIRE PREVENTION: IN FIRE PREVENTION DISTRICTS AND QUASI-FIRE PREVENTION DISTRICTS, FIRE-RETARDANT DOORS AND OTHER FIRE PREVENTION FACILITIES ARE REQUIRED FOR PARTS WHERE THERE IS A RISK OF FIRE SPREADING | ARTICLE 2(4) OF THE BUILDING STANDARDS ACT | e SQUARE METERS | SINCE THIS EXAMPLE SATISFIES THE DESIRES "RELAXED AMBIENCE", "PRIVATE", AND "NOT MUCH SUNNY" AND ARTICLE 2(4) OF THE BUILDING STANDARDS ACT, THE WIDOW SIZE IS DECREASED |
| | | | WINDOW COLOR | TRANSPARENT, BROWN, ETC | PROCURABLE COLORS | LIGHT COLORS | SINCE LIGHT COLORS SATISFY THE DESIRE "WARM HOME", LIGHT COLORS ARE RECOMMENDED. MATCHING WITH THE WALL COLOR SHOULD ALSO BE TAKEN INTO ACCOUNT |
| | | | FRAME COLOR | ARBITRARY | THE FRAME COLOR DEPENDS ON PAINT (MIXTURE) | LIGHT COLORS | SINCE LIGHT COLORS SATISFY THE DESIRE "WARM HOME", LIGHT COLORS ARE RECOMMENDED. MATCHING WITH THE WALL COLOR SHOULD ALSO BE TAKEN INTO ACCOUNT |
| | | | FRAME SHAPE | RECTANGULAR, CIRCULAR, TRIANGULAR, ETC | PROCURABLE OR PRODUCIBLE SHAPES | RECTANGULAR | IT IS RECOMMENDED IN TERMS OF COST. ALSO, IN THE IN-HOUSE CASE COLLECTION, THERE ARE MANY ACHIEVEMENTS USING THE RECTANGULAR SHAPE |
| | | | FRAME TYPE | HORIZONTAL SLIDING WINDOW TYPE, BALANCED WINDOW TYPE, PROJECTED WINDOW TYPE | PROCURABLE OR PRODUCIBLE TYPES | BALANCED WINDOW TYPE | THE REASON IS THAT THE BALANCED WINDOW TYPE SATISFIES THE DESIRES "RELAXED AMBIENCE", "PRIVATE", AND "NOT MUCH SUNNY" |

211 — SELECTED PARTS; 213 — RECOMMENDATION

| SELECTED PARTS | DELETION | | MODIFIABLE ATTRIBUTE | | | | |
|---|---|---|---|---|---|---|---|
| | POSSIBILITY | REASON | ATTRIBUTE NAME | RANGE (UPPER LIMIT/ LOWER LIMIT) | REASON | RECOMMENDATION | REASON |
| "STOVE" IN LIVING ROOM | POSSIBLE | THE STOVE IS NOT ESSENTIAL, AND THERE ARE SUBSTITUTABLE HEATING MEANS SUCH AS FLOOR HEATING SYSTEMS AND AIR CONDITIONERS | POSITION | FRONT SEPARATION DISTANCE OF 1.5 m OR MORE BACK SEPARATION DISTANCE OF 1.0 m OR MORE SIDE SEPARATION DISTANCE OF 1.0 m OR MORE TOP SEPARATION DISTANCE OF 1.5 m OR MORE | FIRE PREVENTION ORDINANCE | IT IS RECOMMENDED TO INSTALL THE STOVE AGAINST THE WALL OR AT A CORNER SO AS TO HAVE A FRONT SEPARATION DISTANCE OF a3 m OR MORE, A BACK SEPARATION DISTANCE OF b3 m OR MORE, A SIDE SEPARATION DISTANCE OF c3 m OR MORE, AND A TOP SEPARATION DISTANCE OF d3 m OR MORE | IT IS DESIRED TO MAKE A CHANGE TO THE EXAMPLE IN WHICH THE STOVE IS INSTALLED AT THE CENTER OF THE LIVING ROOM, AND OTHER IN-HOUSE CASES HAVE BEEN EXTRACTED |
| | | | BRAND | ARBITRARY | NONE IN PARTICULAR | BRAND X BRAND Y BRAND Z | THE BRANDS X, Y, AND Z ARE RECOMMENDED SINCE THEY ARE PROCURABLE BRANDS IN THE CASE OF THIS EXAMPLE, AND SATISFY THE DESIRE "WARM HOME" |
| | | | SIZE | ARBITRARY | NONE IN PARTICULAR | M SIZE | THE M SIZE IS THE SIZE MOST FREQUENTLY USED IN ACHIEVEMENTS |
| | | | COLOR | ARBITRARY | NONE IN PARTICULAR | LIGHT COLORS | SINCE LIGHT COLORS SATISFY THE DESIRE "WARM HOME", LIGHT COLORS ARE RECOMMENDED |

271  272  273

QUERY MODIFICATION ASSISTANCE SYSTEM, SEARCH SYSTEM, AND COMPUTER READABLE MEDIUM

CROSS-REFERENCE TO RELATED APPLICATIONS

This application is based on and claims priority under 35 USC 119 from Japanese Patent Application No. 2019-191529 filed on Oct. 18, 2019.

BACKGROUND

Technical Field

The present invention relates to a query modification assistance system, a search system, and a computer readable medium.

Related Art

Images are inputted as queries to perform a search (for example, please see JP-A-2007-122694). In this case, a user may modify a part or the whole of an image obtained by the previous search and perform a search again in order to obtain search results closer to desires of the user. It may also be possible to modify the position or size of a window included in an image of a room obtained by search, for example, and use the modified image as a new query.

SUMMARY

When using the modified image as a query, the user may obtain search results closer to the image the user has as compared to the case of using the unmodified image.

However, the modification which users make may include a modification not practically allowed. For example, in the case where a modification target is a room, some modifications which the user wants to make to a window or the like may not be practically allowed by laws, regulations, and so on. Although images subjected to such modifications may also be used as queries, in the end, a search needs to be performed again from the beginning.

Aspects of non-limiting embodiments of the present disclosure relate to enabling to present, as compared to the case of accepting a user's modification to an image to be used as a query as it is, information according to a condition related to a modification target to the user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a query modification assistance system including: a processor configured to present, in a case where at least a part of an image used as a query that is to be provided to a search engine is designated as a target to be modified, assist information for assisting a modification according to at least one condition relating to the target, to a user.

BRIEF DESCRIPTION OF DRAWINGS

Exemplary embodiment(s) of the present invention will be described in detail based on the following figures, wherein:

FIG. 4 is a table for explaining information which may be inputted as queries from a terminal operated by a user;

FIG. 5 is a view for explaining an example of feature extraction performed by a feature extracting unit;

FIG. 11 is a table illustrating an example of interface screens which may be used to present designated targets and modification options related to attributes;

FIG. 19 is a table illustrating an example of interface screens used to present designated targets and modification options for attributes.

DETAILED DESCRIPTION

Now, exemplary embodiments of the present invention will be described with reference to the drawings.

Hereinafter, an image search system intended for use in architect offices and design offices will be described.

Architect offices and so on have records on cases handled in the past. Such information include not only images such as design plans and blueprints but also documents such as records on complaints received from customers, accident cases, and in-house reviews. The image search system to be described in the present exemplary embodiment uses such information to assist in improving the efficiency of design tasks.

<System Configuration>

Figure 1:
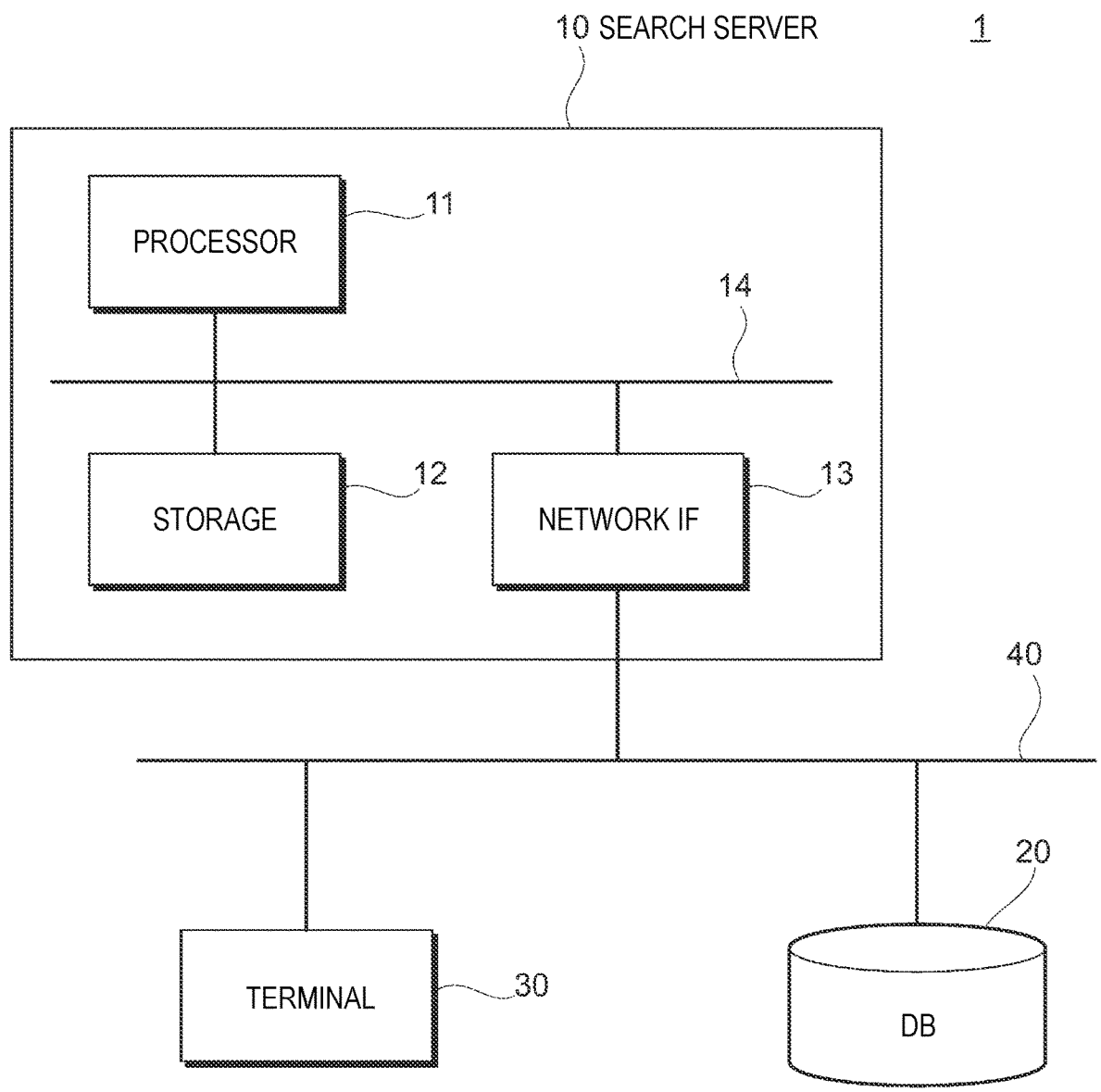
FIG. 1 is a view illustrating a configuration example of an image search system according to an exemplary embodiment.

FIG. 1 is a view illustrating a configuration example of an image search system 1 which is used in the exemplary embodiment.

The image search system 1 shown in FIG. 1 includes a search server 10 for searching for images similar to or related to inputted queries, a database (Data Base) 20 for storing data on images (hereinafter, referred to as image data) as objects of search, a terminal 30 which a user may operate to inputted queries, and a network 40 which connects them with one another in a communicable manner. The network may be a local area network, or may be the Internet. The image search system 1 is an example of a search system.

The search server 10 shown in FIG. 1 includes a processor 11 for performing searches and other processes by executing programs, a storage 12 for storing programs and a variety of data, a network IF (interface) 13 for realizing communication with the outside, and a bus and other signal lines 14 which connect them.

The processor 11 is configured with, for example, a CPU. The storage 12 is configured with, for example, a ROM (Read Only Memory) retaining a BIOS (Basic Input Output system) and so on, a RAM (Random Access Memory) usable as a work area, and a hard disk device retaining basic programs, application programs, and so on. However, the ROM or the RAM may be included in a part of the processor 11. The processor 11 and the storage 12 constitute a computer.

The database 20 shown in FIG. 1 retains not only images such as design plans and blueprints but also documents such as records on complaints received from customers, accident cases, and in-house reviews. These information items are referred to collectively as "past cases".

Information items constituting past cases are associated with tags for search. As a tag for an information item, a set of feature amounts (hereinafter, referred to as features) included therein may be given. In the present exemplary embodiment, sets of features are also referred to as data sets.

The terminal 30 shown in FIG. 1 is a so-called computer. The terminal 30 may be a tablet type computer, a laptop type computer, or a portable computer such as a smart phone or a wearable terminal. In FIG. 1, only one terminal 30 is shown, but the number of terminals is arbitrary.

Also, the number of search servers 10 does not need to be one, and plural computers which cooperate together may be provided. In the present exemplary embodiment, the search server 10 is called an example of a search system. Also, the search server 10 is an example of a query modification assistance system.

<Functional Configuration>

Figure 2:
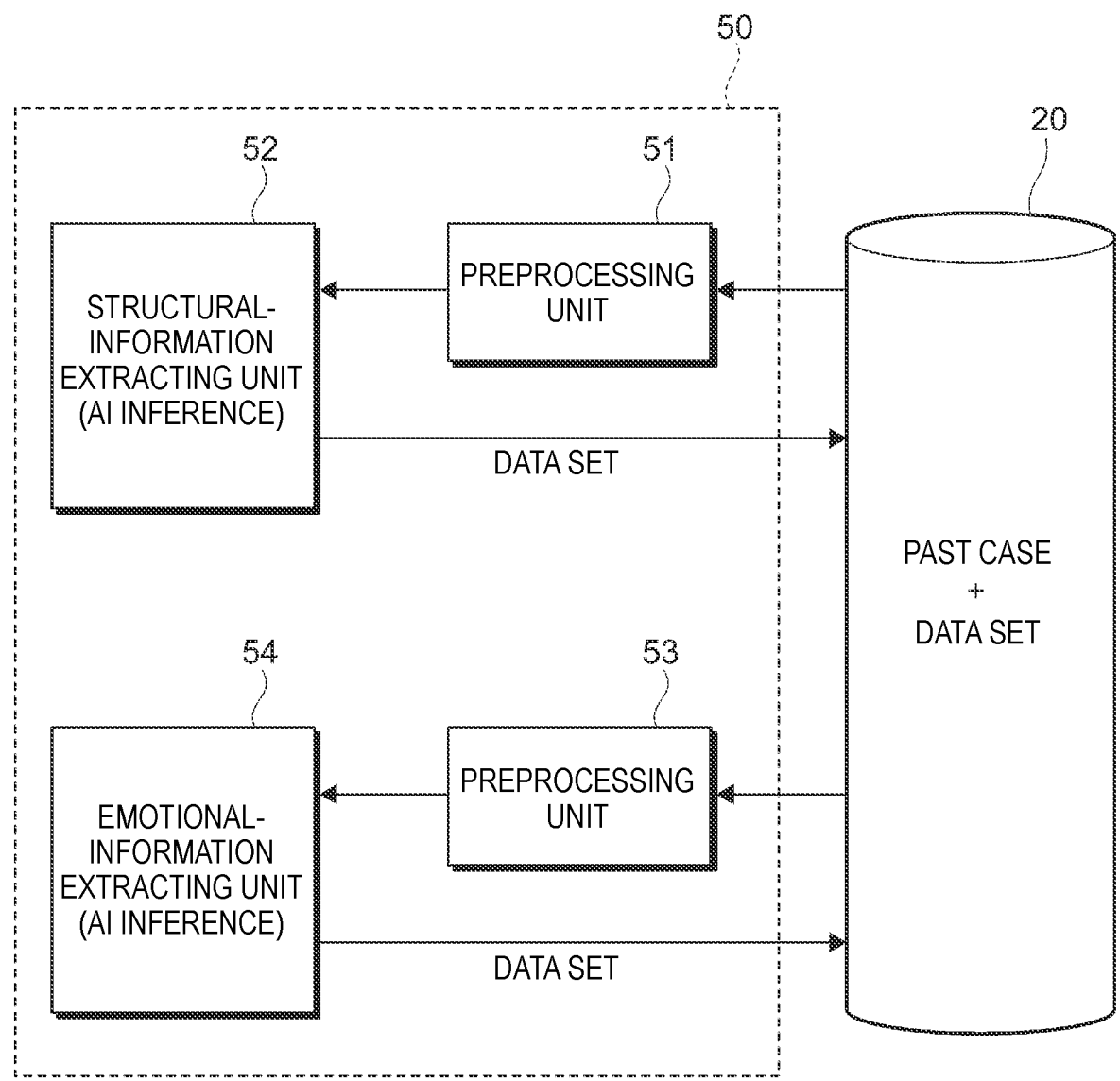
FIG. 2 is a view for explaining the functional configuration of a computer for generating data sets to be recorded in a database.

FIG. 2 is a view for explaining the functional configuration of a computer 50 which generates data sets to be recorded in the database 20.

The hardware configuration of the computer 50 is the same as that of the search server 10 shown in FIG. 1. In other words, the computer 50 includes a processor, a storage, and an interface usable for communication with the database 20.

When reading a past case from the database 20, the computer 50 preprocesses the past case in a preprocessing unit 51 prepared for extraction of features which are classified into structural expressions (hereinafter, referred to as "structural information items"), and gives the preprocessed result to a structural-information extracting unit 52. In the case of FIG. 2, the structural-information extracting unit 52 infers one or more features included in the past case by inference using inference models obtained by learning individual features, and outputs a set of inferred features, as a data set to be associated with the past case, to the database 20.

In the present exemplary embodiment, inference models are prepared for individual features, respectively. The inference models are generated in advance by machine learning or the like. In FIG. 2, inference using inference models is referred to as AI (Artificial Intelligence) inference.

When reading a past case from the database 20, the computer 50 preprocesses the past case in a preprocessing unit 53 prepared for extraction of features which are classified into emotional expressions (hereinafter, referred to as "emotional information items"), and gives the preprocessed result to an emotional-information extracting unit 54. In the present exemplary embodiment, emotional information means features which do not include structural expressions or quantitative expressions. In other words, emotional information means features which include qualitative or subjective expressions.

In FIG. 2, the emotional-information extracting unit 54 infers one or more emotional information items included in the past case by inference using inference models obtained by learning emotional information, and outputs a set of inferred emotional information items, as a data set to be associated with the past case, to the database 20. In the present exemplary embodiment, inference models are prepared for individual emotional information items, respectively. The inference models are generated in advance by machine learning or the like.

As described above, each past case which is accumulated in the database 20 is associated with one or more features belonging to at least one of structural information and emotional information.

Figure 3:
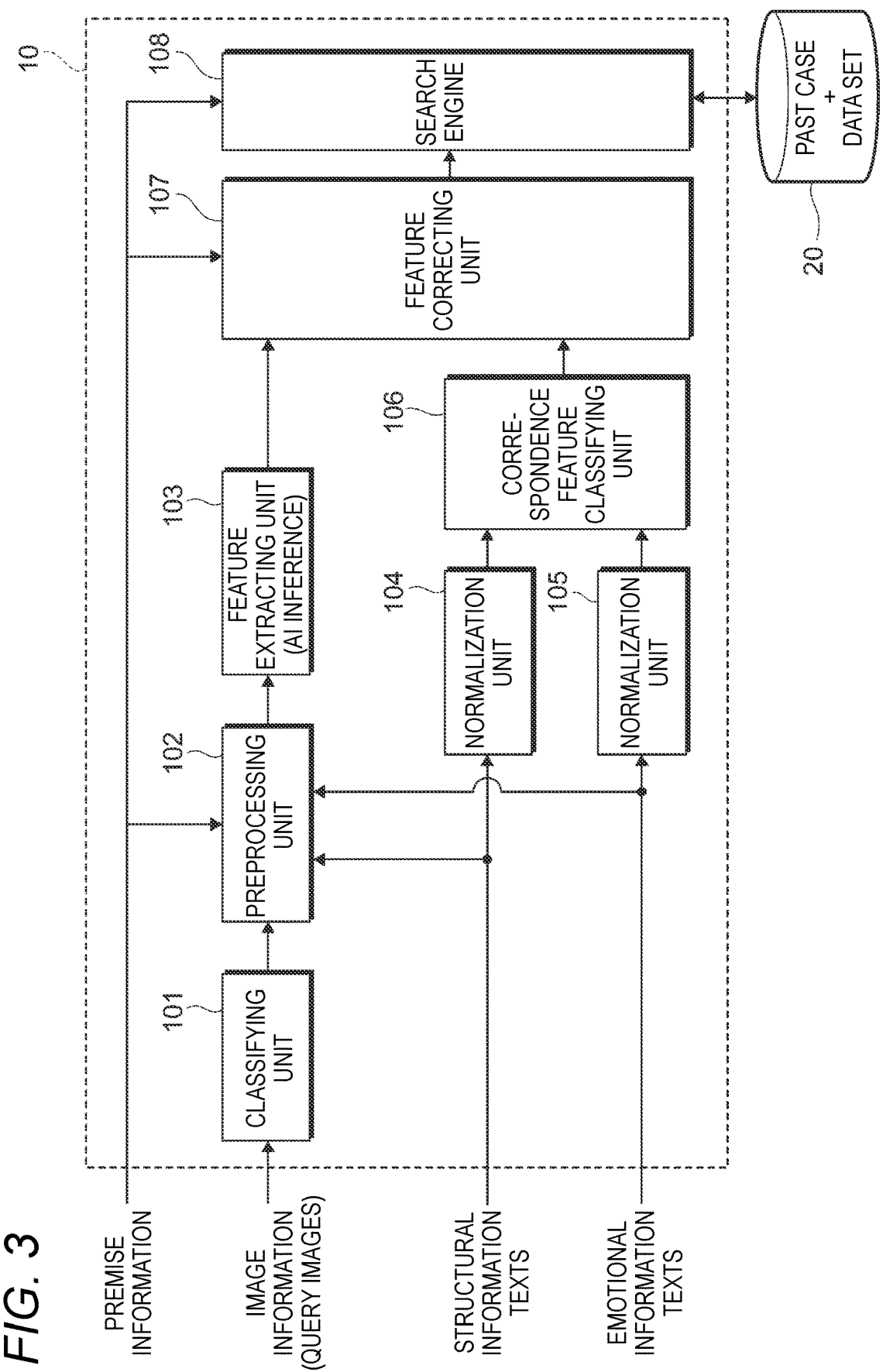
FIG. 3 is a view for explaining the functional configuration of a search server for searching a database for images similar to or related to images which are inputted as queries.

FIG. 3 is a view for explaining the functional configuration of the search server 10 for searching the database 20 for images similar to or related to images which are inputted as queries (hereinafter, referred to as "query images").

The search server 10 functions as a classifying unit 101 for classifying query images by objects, a preprocessing unit 102 for performing a predetermined process on query images, a feature extracting unit 103 for extracting feature amounts (hereinafter, referred to as "features") included in query images, a normalization unit 104 for correcting expressive fluctuations in texts including structural expressions (hereinafter, referred to as "structural information texts"), a normalization unit 105 for correcting expressive fluctuations in texts including emotional expressions (hereinafter, referred to as "emotional information texts"), a correspondence feature classifying unit 106 for classifying features which character strings constituting structural information texts or emotional information texts are associated with, a feature correcting unit 107 for correcting features to be given to a search engine 108, and the search engine 108 for searching the database 20 for cases highly relevant to corrected features.

These functions are realized by execution of a program by the processor 11 (see FIG. 1). The configuration of the search server 10 except for the search engine 108 is an example of a search criterion specifying system.

To the search server 10 of the present exemplary embodiment, premise information, image information, structural information texts, and emotional information texts are inputted as queries (hereinafter, referred to as search queries) from the terminal 30 (see FIG. 1).

All of the four types of information do not need to be inputted as queries. Also, in the present exemplary embodiment, structural information texts and emotional information texts do not need to be clearly distinguished. In practice, there is no restriction on expressive types which are used in inputting texts. Therefore, without distinguishing between them, users may input requests for obtaining desired past cases by search, in character strings.

FIG. 4 is a table for explaining information which may be inputted as queries from the terminal 30 which the user operates.

Premise information is structural or quantitative information having a high priority, of queries which the user inputs, as compared to the other queries. In premise information, laws, regulations, and so on are included. Premise information is an example of criteria related to objects of search. However, the user is not required to input laws, regulations, and so on.

In the present exemplary embodiment, images regarding constructions are used as objects of search.

Therefore, as premise information, for example, address, land size, site condition, environments, property type, budget, existence or non-existence of a garden, existence or non-existence of a car, existence or non-existence of a garage, a family structure, and the number of families may be given. Examples of property types include buildings, condominiums, and detached houses.

Image information are so-called query images. As image information, for example, hand-drawn pictures, photographs, leaflets, and CG (computer graphics) may be given. In the present exemplary embodiment, image information has lower priority as compared to the other types of queries.

Structural information texts are texts including structural expressions. As structural information texts, for example, there are texts "two-family house", "10 minutes walking distance", "three rooms and one living room with a dining room-kitchen area", and "wooden house".

Emotional information texts are texts including emotional expressions. As emotional information texts, for example, there are texts "openness", "family gathering", "Japanese style space", and "warmth of wood".

By the way, sometimes, structural information texts and emotional information texts are inputted without being clearly distinguished. As a text in which there are structural expressions and emotional expressions together, for example, there is a text "a bright living room with openness". Since the expression "living room" is a noun which may be clearly specified, it is a structural expression; whereas since the expressions "openness" and "bright" are adjectives representing sensual states, they are emotional expressions.

FIG. 3 will be further described.

The classifying unit 101 classifies query images inputted by the user, by objects. In the present exemplary embodiment, each query image is classified into one of a building image category, a kitchen image category, and an external appearance image category. Naturally, the number of candidates for categories which images may be classified into is not limited to three. As other candidates, for example, there are candidates "Child's Room", "Bedroom", "Bathroom", "Toilet", "Entrance", "Garden", etc. The classifying unit 101 adds classification results as attributes of individual query images.

The preprocessing unit 102 performs a predetermined process on each inputted query image. Examples of the predetermined process include size adjustment, contrast adjustment, edge enhancement, noise removal, etc.

Besides, in the preprocessing unit 102 shown in FIG. 3, a function of removing parts contradicting any other criterion from query images is prepared as one of preprocessing. For example, in the case where a garage is included in a query image although it is defined in premise information that a garage is unnecessary, the preprocessing unit 102 performs correction for removing the garage part from the query image. Here, when one is referred to as contradicting another, both are not met at the same time, or do not coexist. Also, in the present exemplary embodiment, contradicting parts are also referred to as non-matching parts.

However, correction on parts contradicting other criteria is not essential.

The feature extracting unit 103 extracts one or more features included in each query image by collating with inference models prepared for individual features by machine learning or the like.

FIG. 5 is a view for explaining an example of feature extraction which is performed by the feature extracting unit 103. In the case of FIG. 5, from a living room photograph inputted as a query image, features "High Ceiling", "High Window", "Ladder", "Flooring", "Warmth of Wood", "Open", "Ceiling Fan", "Spot light", etc. are extracted as features.

FIG. 3 will be further described.

The normalization unit 104 corrects expressive fluctuations in structural information texts inputted as queries by the user. For example, character types are unified, i.e. fluctuations in spellings and notations are absorbed.

The normalization unit 105 corrects expressive fluctuations in emotional information texts inputted as queries by the user. Also, by the normalization unit 105, individual variations in expression are also corrected.

The correspondence feature classifying unit 106 determines whether each character string constituting a structural information text or an emotional information text corresponds to a structural feature, or to an emotional feature, or to both.

The feature correcting unit 107 performs a process of correcting features to be given to the search engine 108 such that it becomes easier to obtain search results intended by the user. The feature correcting unit 107 according to the present exemplary embodiment eliminates contradictions between extracted features. For example, the feature correcting unit 107 performs correction for eliminating features contradicting premise information, from features extracted from query images. Also, for example, the feature correcting unit 107 performs correction for eliminating features contradicting between plural query images.

Figure 6:
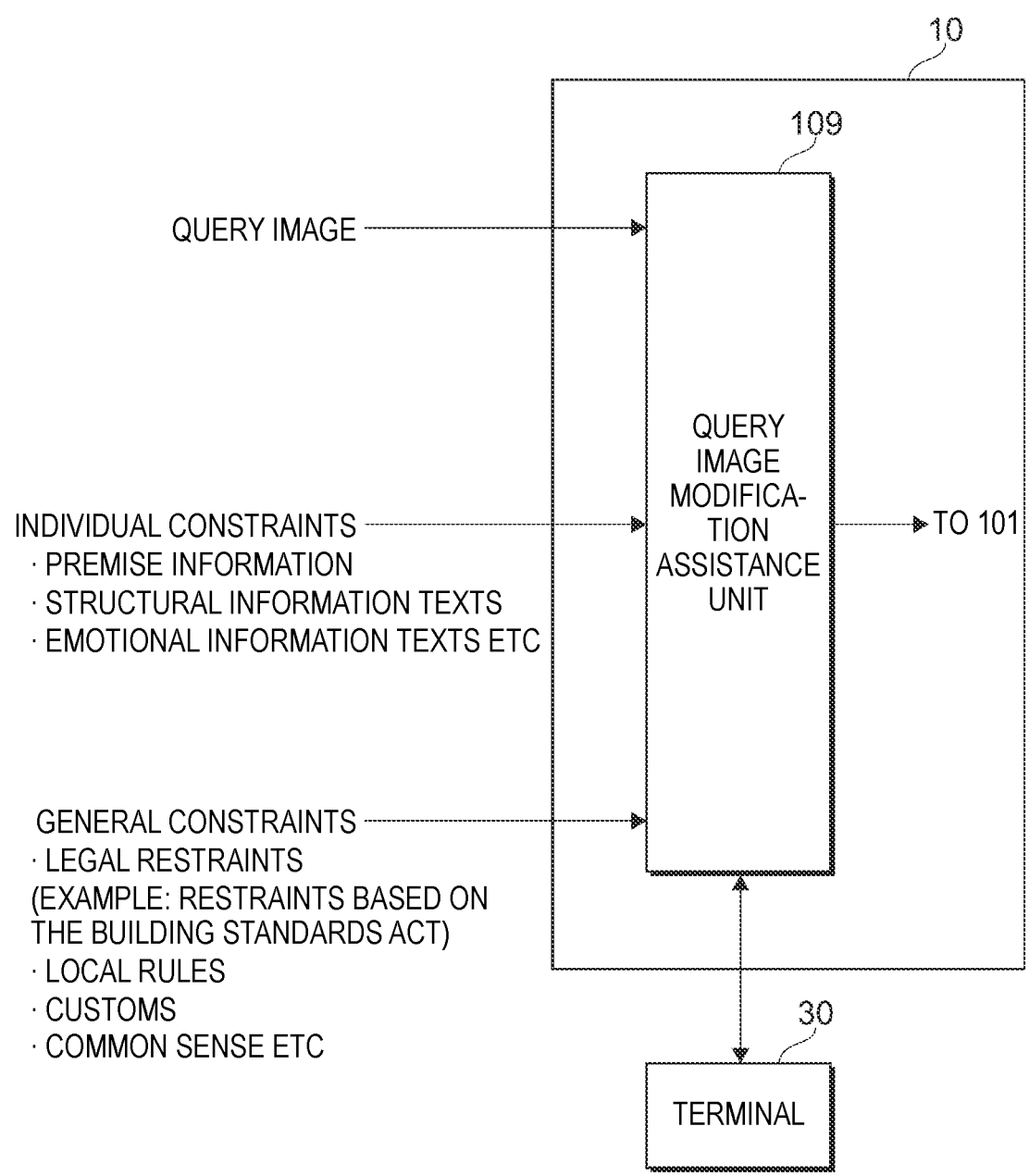
FIG. 6 is a view for explaining another function provided to the search server according to the exemplary embodiment.

FIG. 6 is a view for explaining another function which is provided to the search server 10 used in the exemplary embodiment.

The search server 10 according to the present exemplary embodiment is provided with a function of assisting a user in modifying query images which are inputted to the classifying unit 101 or images which are search results.

In the present exemplary embodiment, this function is referred to as a query image modification assistance unit 109. The query image modification assistance unit 109 is an example of a query modification assistance system.

Here, the assistance is performed in order to reduce the number of times of reworking on results of search using modified query images. By the way, as causes of an increase in the number of reworking times, there are the case where the discrepancy between search results and the intention of the user is never resolved, the case where search results cannot be used as they are due to external causes such as laws, ordinances, etc., and so on.

For this reason, the query image modification assistance unit 109 according to the present exemplary embodiment assists the user in changing such that the contents of modifications on targets designated by the user do not contradict or violate related constraints. The constraints are examples of criteria related to the targets designated by the user. In the present exemplary embodiment, criteria related to targets designated by the user impose limits on modification contents, modification ranges, and so on.

In the exemplary embodiment, query images which the query image modification assistance unit 109 modifies include not only query images which are newly inputted but also images which are output as search results from the database 20 (see FIG. 1).

Also, constraints which the query image modification assistance unit 109 uses to assist include constraints reflecting user's own desires (hereinafter, referred to as individual constraints) and general constraints. Individual constraints and general constraints are examples of criteria related to targets which are designated by the user.

Specific examples of individual constraints include premise information, structural information texts, emotional information texts, etc. Also, specific examples of general constraints include laws, government ordinances, rules, ordinances, other legal restraints, local restraints which are determined by a business operator who uses the image search system 1 (see FIG. 1) or a business operator who provides search services, customs and common sense uncodified, etc. As legal rules, for example, there are the Building Standards Act and the Fire Prevention Ordinance.

<Example of Process of Assisting in Changing Query Image>

Hereinafter, an example of a processing operation which is performed by the processor 11 (see FIG. 1) functioning as the query image modification assistance unit 109 (see FIG. 6) will be described with reference to FIG. 7 and FIG. 8.

Figure 7:
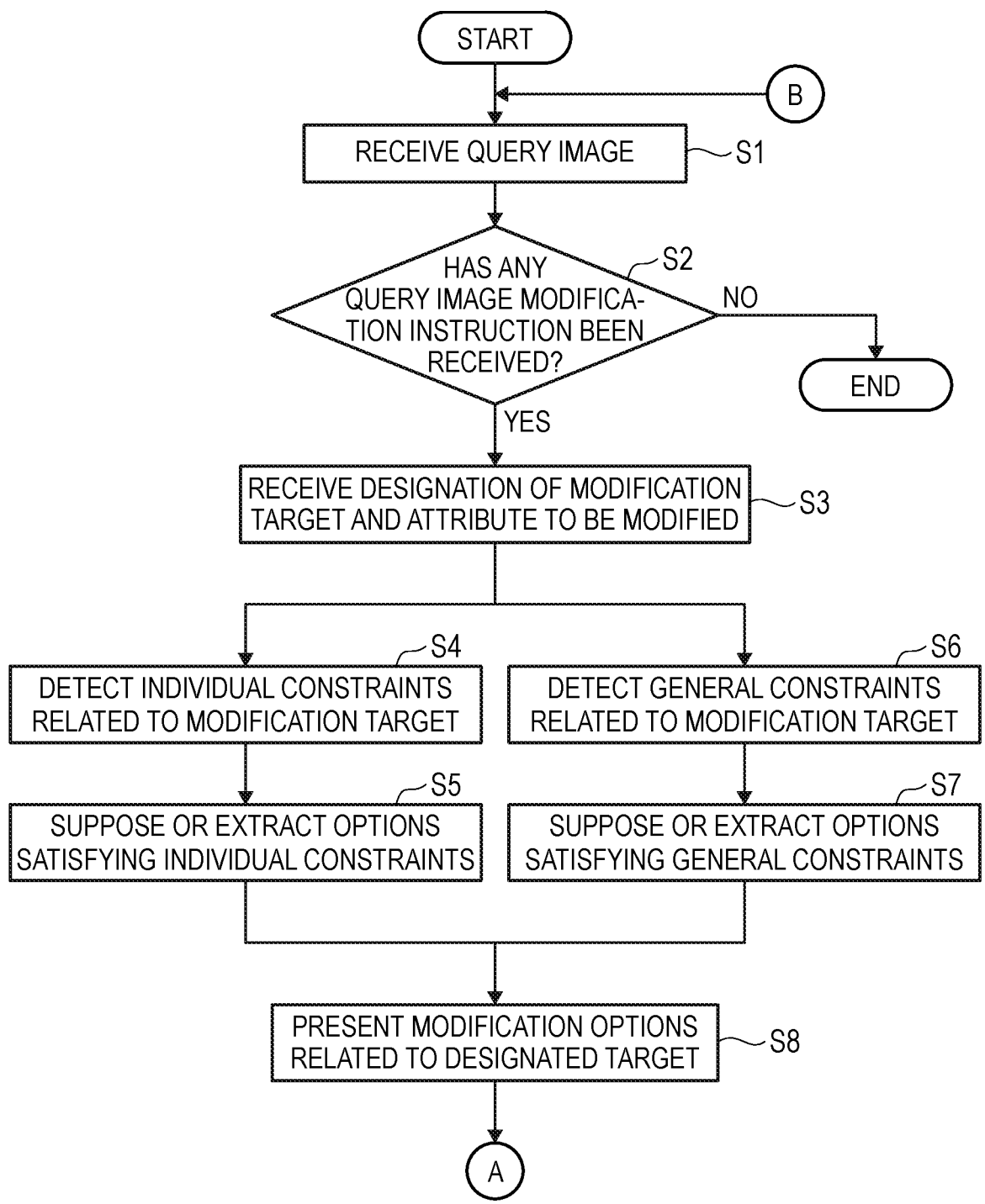
FIG. 7 is a flow chart for explaining a part of a process which a query image modification assistance unit performs.
Figure 8:
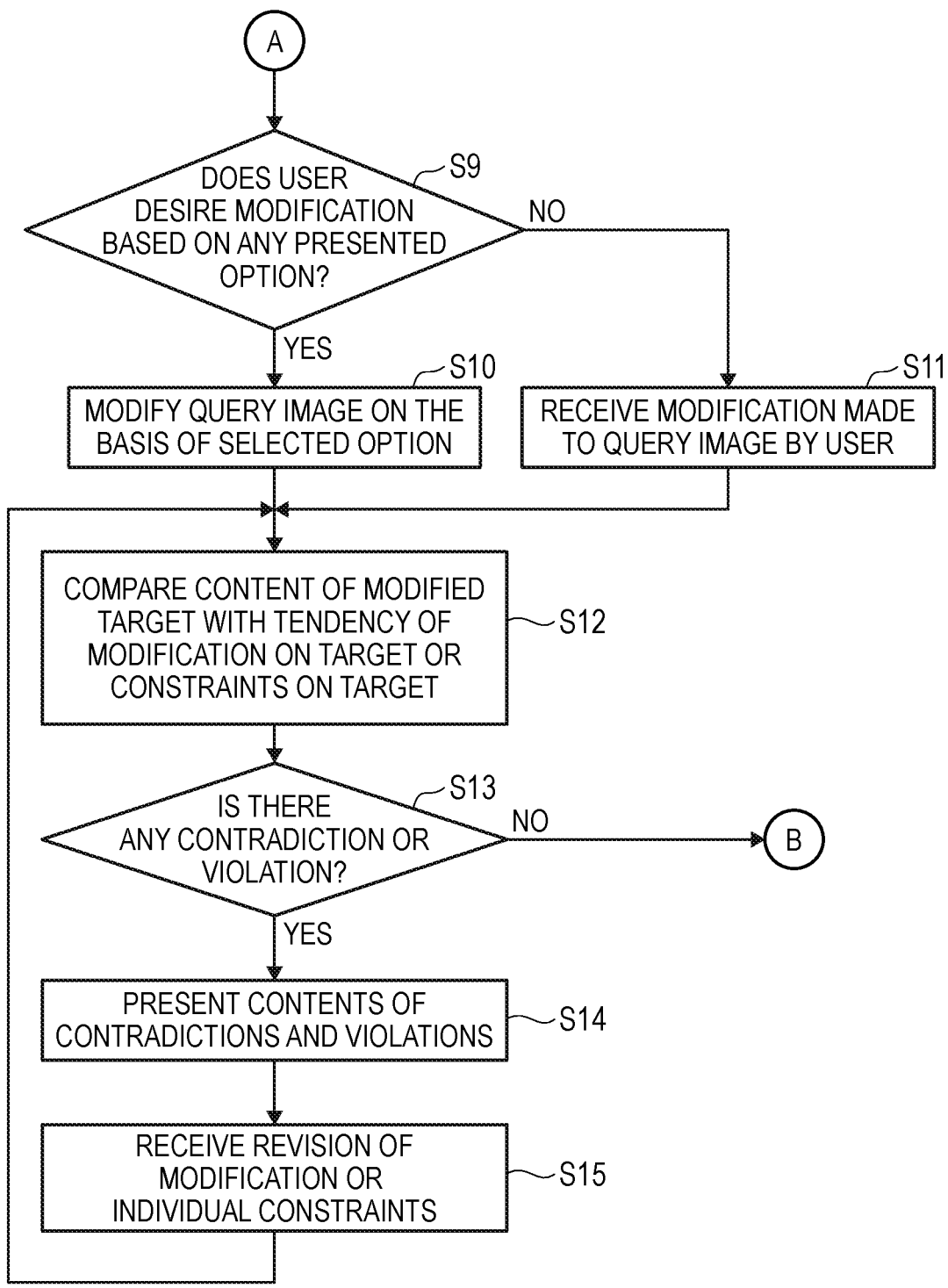
FIG. 8 is a flow chart for explaining another part of the process which the query image modification assistance unit performs.

FIG. 7 is a flow chart for explaining a part of a process which the query image modification assistance unit 109 performs. FIG. 8 is a flow chart for explaining the other part of the process which the query image modification assistance unit 109 performs. In FIG. 7 and FIG. 8, a reference symbol "S" means a step.

First, the query image modification assistance unit 109 receives a query image (STEP 1). Here, query images include query images which the user newly inputs, and images which the user selects from search results. In the present exemplary embodiment, the number of query images is one. However, plural query images may be inputted.

Next, the query image modification assistance unit 109 determines whether any query image modification instruction has been received from the user (STEP 2).

In the case where any modification instruction has not been received, the query image modification assistance unit 109 obtains a negative result in STEP 2. If obtaining the negative result in STEP 2, the query image modification assistance unit 109 ends the process, and confirms the query image. The confirmed query image is given to the classifying unit 101 (see FIG. 3), and a search is started.

Meanwhile, in the case where a modification instruction has been received, the query image modification assistance unit 109 obtains a positive result in STEP 2. If obtaining the positive result in STEP 2, the query image modification assistance unit 109 receives designation of a modification target and an attribute to be modified (STEP 3).

The user designates a modification target, for example, by designating an area on the query image with a mouse pointer. For example, if the query image modification assistance unit 109 acquires the coordinates of the mouse pointer, it processes the image in the area existing at the corresponding position, and specifies an object designated with the mouse pointer. As another method, there is a method of designating a modification target by a text. For example, a text "Window" is inputted to a modification target field, or from options, an option "Window" is selected.

Designation of an attribute to be modified, and modifications of attributes are performed, for example, by performing right-clicking, dragging, and the like on the target. As attributes, for example, there are "Position", "Size", "Design", "Color", and so on. The number of attributes which are designated to be modified is not limited to one. In other words, plural attributes may be designated.

The attribute "Position" may be modified, for example, by performing a drag and drop on the screen. Also, the attribute "Size" may be modified to be larger or smaller, for example, by dragging out or in a corner of a rectangular range indicating a designated target. Also, if right-clicking is performed in the state where the mouse pointer is on a target, a menu is displayed on the screen such that it is possible to designate a desired attribute to be modified from the menu. By the way, attributes which may be modified depend on targets. For example, attributes of a target "Window" and attributes of a target "Stove" are different.

Similarly to target designation, attribute designation may also be performed by inputting a text or selecting an option from options displayed on the screen. However, unlike target designation, attribute designation is not essential.

If a modification target is specified, the query image modification assistance unit 109 performs the processes of STEP 4 and STEP 5 and the processes of STEP 6 and STEP 7 in parallel. STEP 4 and STEP 5 are processes related to individual constraints, and STEP 6 and STEP 7 are processes related to general constraints.

However, unlike the example of FIG. 7, the processes of STEP 4 to STEP 7 may be performed in chronological order.

First, the processes related to individual constraints will be described.

In STEP 4, the query image modification assistance unit 109 detects individual constraints related to the modification target. As described above, individual constraints are constraints which are input by the user who is a search executor, and are, for example, premise information, structural information texts, and emotional information texts. The query image modification assistance unit 109 according to the present exemplary embodiment detects a constraint related to the modification target, for example, by analyzing the meanings defined by individual constraints.

As individual constraints, for example, there are "Relaxed Ambience", "Private", "Not Much Sunny", "Large Window", and "Bright Room". These constraint examples are related to the positions, colors, sizes, frame types, and so on of windows.

Also, for example, in individual constraints, information on the subject-based categories of query images which are targets to be processed also are included. For example, information on which of categories "External Appearance of Construction", "Living Room", "Toilet", "Bathroom", "Wash Room", "Entrance", and "Storeroom", and "Service Room" a query image belongs to may be used. Classification of query images may use the function of the classifying unit 101 (see FIG. 3).

However, the subject-based categories of query images may be designated by structural information texts. For example, it may be also possible to designate the subject-based category of a query image by a text such as "to be used in a living room". The categories of query images are important information in narrowing down related constraints. For example, the contents of constraints on a window in the case where a query image of a living room is given may be different from the contents of constraints on a window in the case where a query image of a bathroom is given. By the way, in the case where the subject of a query image is a storeroom, there is no constraint on windows.

If individual constraints related to the target designated by the user are detected, the query image modification assistance unit 109 supposes or extracts options satisfying the detected individual constraints (STEP 5).

In STEP 5, for example, the query image modification assistance unit 109 extracts similar cases as options from the past cases, or supposes options highly likely to be desired by the user, from the tendency of accumulated modification histories and so on.

Now, the processes related to general constraints will be described.

In STEP 6, the query image modification assistance unit 109 detects general constraints related to the modification target.

As described above, general constraints are constraints which are determined regardless of the user who is a search executor, and are, for example, legal restraints, local rules, customs, and common sense. This information is stored, for example, in the storage 12 (see FIG. 1) or a database (not shown in the drawings).

The query image modification assistance unit 109 detects constraints related to the object designated as the modification target, for example, by analyzing the meanings defined by the general constraints.

Constraints based on the Building Standards Act include, for example, constraints on window size. Also, windows for buildings which are intended to be constructed in fire prevention districts and quaci-fire prevention districts are required to have fire-retardant doors and fire prevention facilities. From premise information, it may be specified that premise for a search is a building in a fire prevention district or a quaci-fire prevention district. Therefore, in searching for general constraints, information such as premise information is also used.

Also, constraints based on local rules include, for example, the glass colors, frame materials, frame paint types, and brand names of windows which the business operator may recommend or procure.

Also, constraints based on customs and common sense include, for example, constraints on strength, convenience, security, wiring, ventilation, furniture arrangement, and consideration for neighborhoods.

If general constraints related to the target designated by the user are detected, the query image modification assistance unit 109 extracts options satisfying the detected general constraints (STEP 7).

In STEP 7, the query image modification assistance unit 109 extracts similar cases as options from the past cases.

If options are supposed or extracted in STEP 5 and STEP 7, the query image modification assistance unit 109 presents modification options related to the designated target on the terminal 30 (see FIG. 1) which the user operates (STEP 8).

As methods of presenting the options, for example, there are a method of presenting the options on the query image, a method of presenting the options separately from the query image, and a method of presenting the options in the form of a chart or the like.

Thereafter, the query image modification assistance unit 109 determines whether the user desires a modification based on any presented option (STEP 9). This determination is performed, for example, on the basis of whether any specific option has been selected by the user.

If obtaining a positive result in STEP 9, the query image modification assistance unit 109 modifies the query image on the basis of the selected option (STEP 10). Meanwhile, if obtaining a negative result in STEP 9, the query image modification assistance unit 109 receives a modification made to the query image by the user (STEP 11).

Thereafter, the query image modification assistance unit 109 compares the content of the modified target with the tendency of or constraints on modifications which may be made to the modification target (STEP 12). Specifically, the query image modification assistance unit 109 checks whether the content of the modified target contradicts or violates the tendency of or constraints on modifications which may be made to the modification target, or not.

Subsequently, the query image modification assistance unit 109 determines whether there is any contradiction or violation (STEP 13).

In the case where there is no contradiction or violation, the query image modification assistance unit 109 obtains a negative result in STEP 13, and returns to STEP 1. In other words, the query image modification assistance unit sets the modified query image as a new query image.

Meanwhile, in the case where there is any contradiction or violation, the query image modification assistance unit 109 obtains a positive result in STEP 13.

In this case, the query image modification assistance unit 109 presents the contradictions and violations to the user (STEP 14).

In this case, the query image modification assistance unit 109 receives a revision of the modification or a revision of the individual constraints (STEP 15), and returns to STEP 12. This loop process is continued until a negative result is obtained in STEP 13.

USER INTERFACE EXAMPLES

Hereinafter, specific examples of interface screens which may be displayed on the terminal 30 (see FIG. 1) will be described.

First Example

Figure 9A:
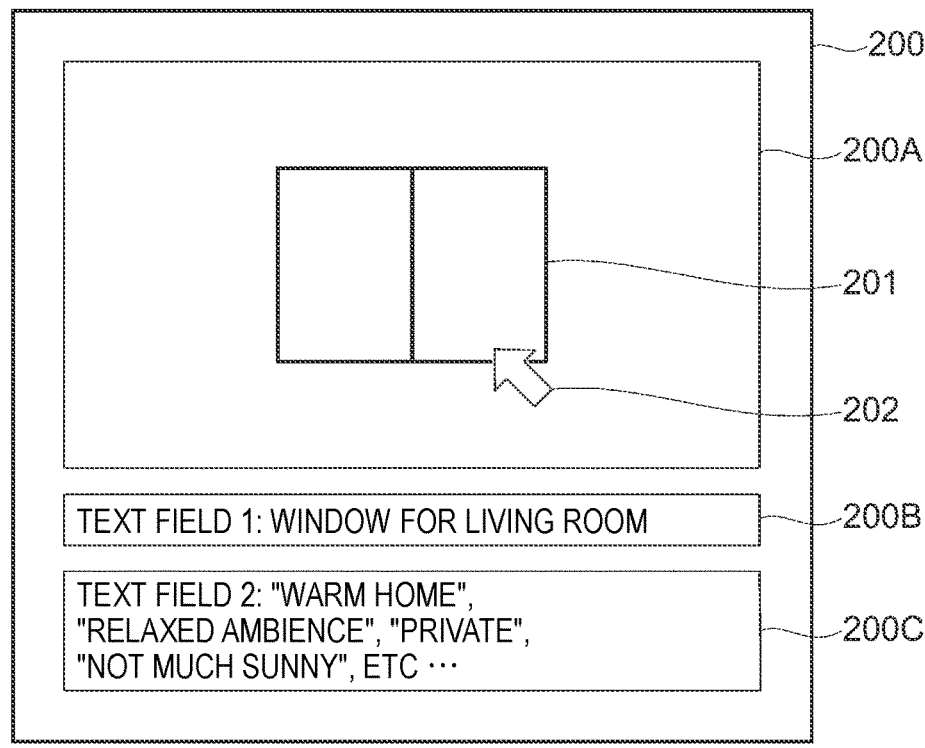
FIG. 9A is a view illustrating an example of interface screens used to designate targets and attributes, in which a modification target is designated.
Figure 9B:
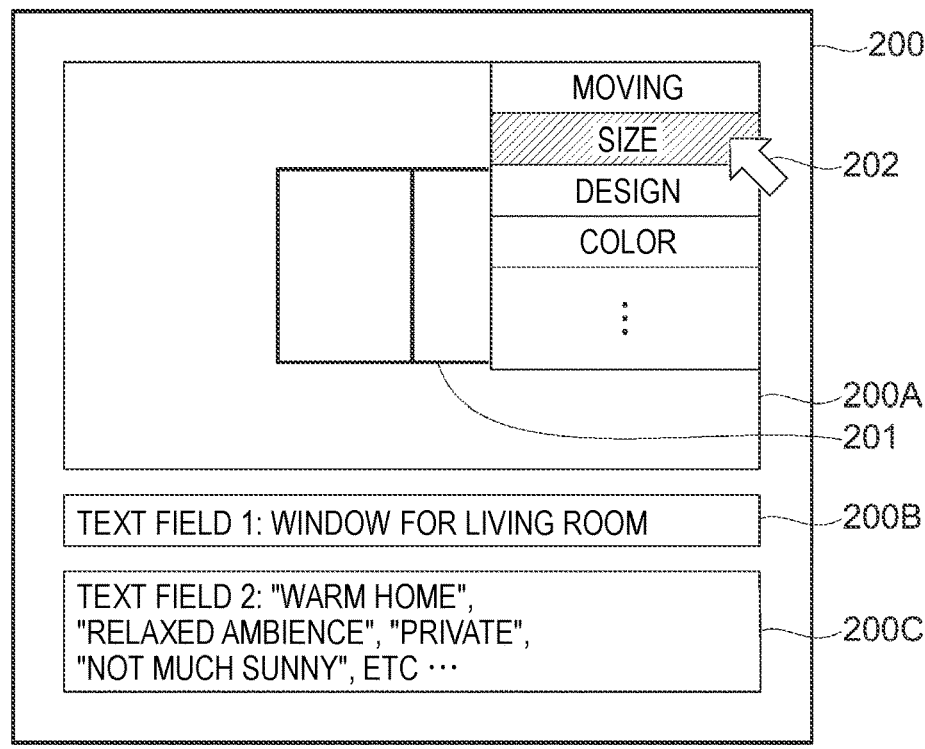
FIG. 9B is a view illustrating an example of interface screens which may be used to designate targets and attributes, in which an attribute to be modified is designated.

FIGS. 9A and 9B are views illustrating an example of an interface screen which is used to designate a target and an attribute. FIG. 9A shows an example in which a modification target is designated, and FIG. 9B shows an example in which an attribute to be modified is designated.

An interface screen 200 shown in FIGS. 9A and 9B may be used in STEP 3 (see FIG. 7).

The interface screen 200 shown in FIGS. 9A and 9B includes a query image display field 200A, a text field 200B for inputting structural information texts, and a text field 200C for inputting emotional information texts.

In the interface screen 200 shown in FIG. 9A, a window 201 has been designated as a modification target by a mouse pointer 202. Also, in the text field 200B, the window which is the modification target is designated to be used in a living room. Further, in the text field 200C, with respect to the window is the modification target, desires "Warm Home", "Relaxed Ambience", "Private", "Not Much Sunny", etc. have been designated.

The interface screen 200 shown in FIG. 9B shows a state where a pull-down menu has been opened by performing an operation such as clicking the right mouse button. The pull-down menu includes a list of attribute candidates for the designated target. In the case of FIG. 9B, "Moving", "Size", "Design", and "Color" are shown. Also, FIG. 9B shows a state where the attribute "Size" has been designated as an attribute to be modified. For this reason, the row of the attribute "Size" has been highlighted.

Figure 10:
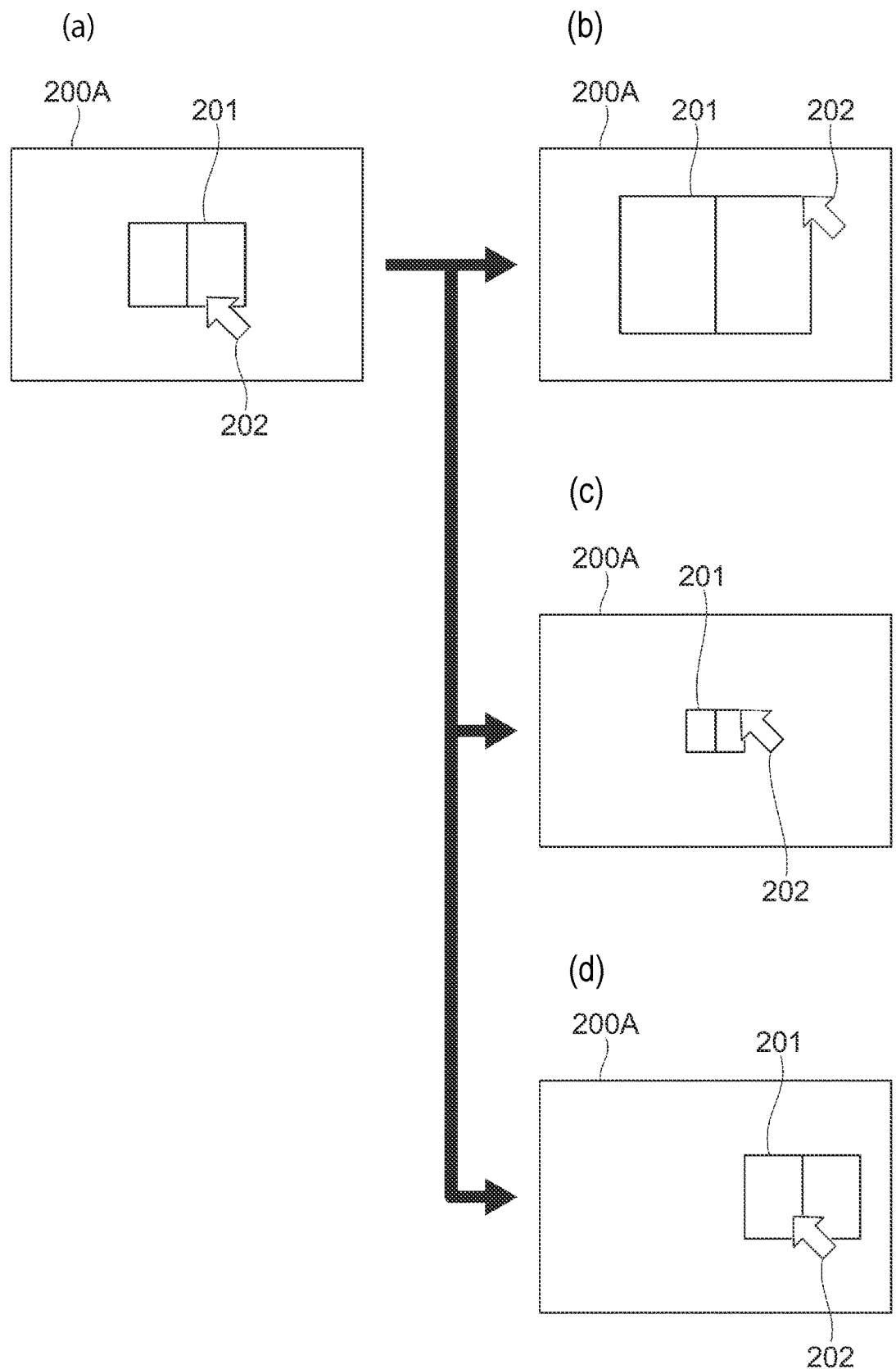
FIG. 10 is a view illustrating an example of interface screens which may be used to receive modifications, wherein (a) shows a state where a modification target has been designated, and (b) shows an example in which the size of the modification target is increased by an operation on the screen, and (c) shows an example in which the size of the modification target is decreased by an operation on the screen, and (d) shows an example in which the modification target is moved by an operation on the screen.

FIG. 10 is a view illustrating an example of an interface screen which may be used to receive a modification, wherein (a) shows a state where a modification target has been designated, and (b) shows an example in which the size of the modification target is increased by performing an operation on the screen, and (c) shows an example in which the size of the modification target is decreased by performing an operation on the screen, and (d) shows an example in which the modification target is moved by performing an operation on the screen.

In FIG. 10, only the query image display field 200A is shown. Also, the interface screen shown in FIG. 10 may be used, for example, in STEP 11 (see FIG. 8).

Also, in FIG. 10, the window 201 has been designated as a modification target. However, in the case of FIG. 10, if the window 201 in the query image is designated by the mouse pointer 202, the window is recognized as an object and becomes modifiable. Therefore, in FIG. 10, the size of the object is modified by positioning the mouse pointer 202 on a corner of the object and dragging the corner diagonally. Also, in the state where the window 201 has been designated, the object is moved by dragging the mouse pointer 202.

The display shown in FIG. 10 is an example of information to assist in modification.

Second Example

FIG. 11 is a table illustrating an example of an interface screen 210 which may be used to present a designated target and modification options related to attributes.

The table shown in FIG. 11 presupposes the designation shown in FIG. 9A. In other words, the modification target is the window for the living room.

In the case of FIG. 11, the modification target is shown in a "Selected Parts" field 211. For attributes to be modified, a "Deletion" field 212 and a "Modifiable Attribute" field 213 are provided.

The "Deletion" field 212 includes a "Possibility" field and a "Reason" field. In FIG. 11, deletion of the window is "impossible" since the window which is the modification target is for the living room.

Therefore, in the "Reason" field, information "The window will be used in the living room, and constraints related to windows for living rooms include Article 2(4) of the Building Standards Act." is displayed.

The "Modifiable Attribute" field 213 includes an "Attribute Name" field, a "Range (Upper Limit/Lower Limit)" field, a "Reason" field, a "Recommendation" field, and another "Reason" field. Here, the slash "/" may mean "or".

In FIG. 11, as examples of attribute names, "Position on Wall", "Window Size", "Window Color", "Frame Color", "Frame Shape", and "Frame Type" are shown.

Hereinafter, the contents described with respect to the individual items shown in the "Attribute Name" field will be described.

(Position on Wall)

In FIG. 11, in the "Range (Upper Limit/Lower Limit)" field, information such as "Height of a1 cm from Floor", "Distance of b1 cm to Ceiling", "Distance of c1 cm to Left Wall", and "Distance of d1 cm to Right Wall" is shown.

In the "Reason" field, as the reason why the modification range is limited, information such as "For Strength, the level of difficulty in construction, ease of opening and closing, security (for children), electrical wiring, ventilation, furniture arrangement, neighborhood, etc." is shown.

In the "Recommendation" field, information such as "Height of a2 cm from Floor", "Distance of b2 cm to Ceiling", "Distance of c2 cm to Left Wall", and "Distance of d2 cm to Right Wall" is shown.

In the "Reason" field, the reason of the recommendation, such as "They are recommended in consideration of strength, cost, convenience, security, and the influence on others, and the company has many achievements using them." is shown.

(Window Size)

In FIG. 11, in the "Range (Upper Limit/Lower Limit)" field, information such as "Natural Lighting: The area effective for natural lighting, i.e. at least 1/7 of the floor area in the living room is required.", "Ventilation: The area effective for ventilation, i.e. at least 1/20 of the floor area in the living room is required.", and "Fire Prevention: In fire prevention districts and quaci-fire prevention districts, fire-retardant doors and other fire prevention facilities are required for parts where there is a risk of fire spreading." is shown.

In the "Reason" field, as the reason why the modification range is limited, "Article 2(4) of the Building Standards Act" is shown.

In the "Recommendation" field, "e square meters" is shown.

In the "Reason" field, the reason of the recommendation such as "Since this example satisfies the desires "Relaxed Ambience", "Private", and "Not Much Sunny" and Article 2(4) of the Building Standards Act, the widow size is decreased." is shown.

(Window Color)

In FIG. 11, in the "Range (Upper Limit/Lower Limit)" field, information such as "Transparent, Brown, ETC" is shown.

In the "Reason" field, as the reason why the modification range is limited, information "Procurable Colors" is shown.

In the "Recommendation" field, information "Light Colors" is shown.

In the "Reason" field, the reason of the recommendation such as "Since light colors satisfy the desire "Warm Home", light colors are recommended. Matching with the wall color should also be taken into account." is shown. By the way, the recommendation reason may reflect in-house standards or design standards of the construction industry. These are a kind of custom or common sense.

(Frame Color)

In FIG. 11, in the "Range (Upper Limit/Lower Limit)" field, information "Arbitrary" is shown. In other words, there is no constraint on the frame color.

In the "Reason" field, as the reason why the modification range is limited, information such as "The frame color depends on paint (mixture)." is shown.

In the "Recommendation" field, information "Light Colors" is shown.

In the "Reason" field, the reason of the recommendation such as "Since light colors satisfy the desire "Warm Home", light colors are recommended. Matching with the wall color should also be taken into account." is shown. By the way, the recommendation reason may reflect in-house standards or design standards of the construction industry.

(Frame Shape)

In FIG. 11, in the "Range (Upper Limit/Lower Limit)" field, information "Rectangular, Circular, Triangular, etc." is shown.

In the "Reason" field, as the reason why the modification range is limited, information such as "Procurable or Producible Shapes" is shown.

In the "Recommendation" field, "Rectangular" is shown.

In the "Reason" field, as the reason of the recommendation, information such as "It is recommended in terms of cost. Also, in the in-house case collection, there are many achievements using the rectangular shape." is shown.

(Frame Type)

In FIG. 11, in the "Range (Upper Limit/Lower Limit)" field, information "Horizontal Sliding Window Type, Balanced Window Type, Projected Window Type" is shown.

In the "Reason" field, as the reason why the modification range is limited, information such as "Procurable or Producible Types" is shown.

In the "Recommendation" field, information "Balanced Window Type" is shown.

In the "Reason" field, information "The reason is that the balanced window type satisfies the desires "Relaxed Ambience", "Private", and "Not Much Sunny"." is shown.

The display shown in FIG. 11 is an example of information to assist in changing.

Third Example

Figure 12:
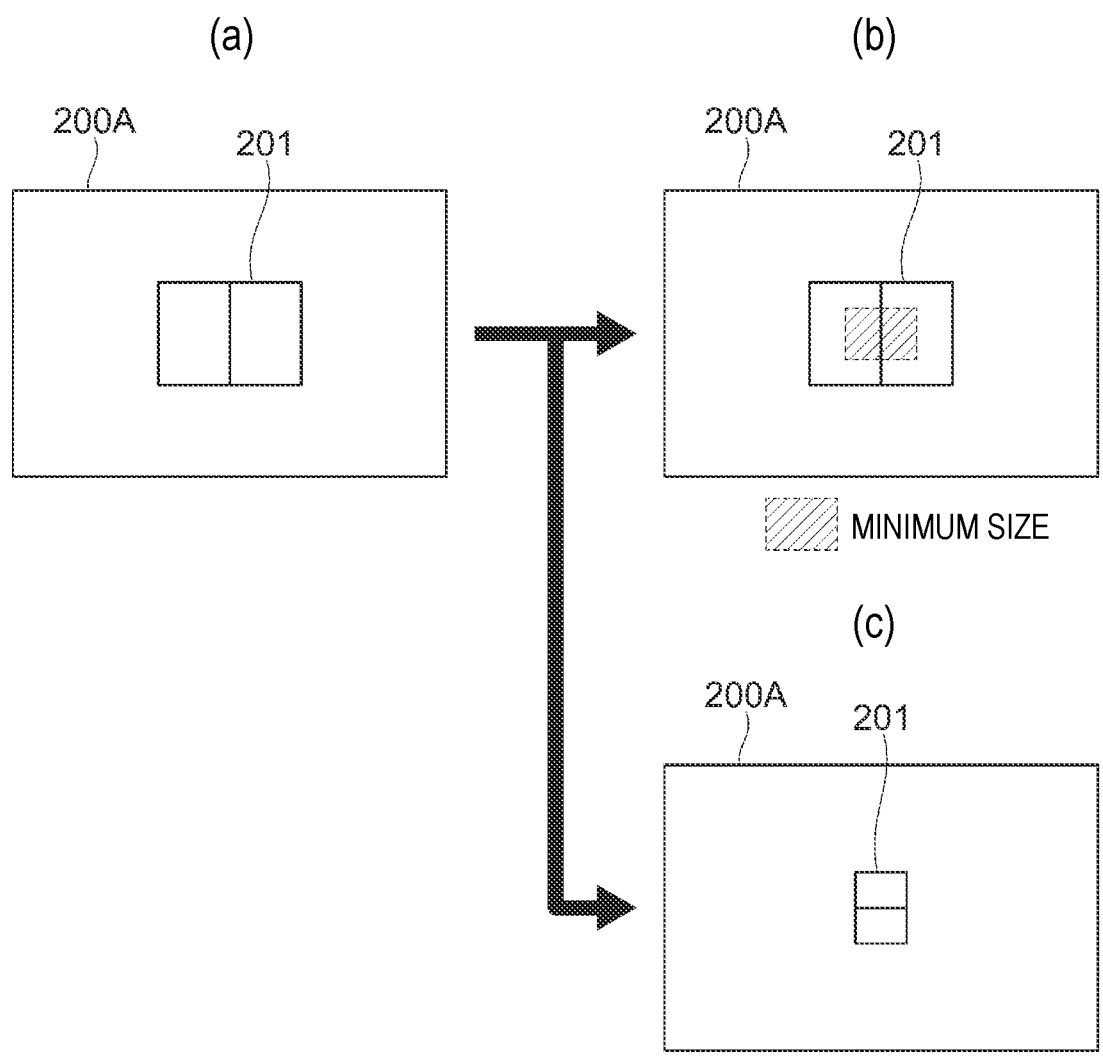
FIG. 12 is a diagram illustrating another example of interface screens which may be used to present designated targets and options related to attributes, wherein (a) shows a screen displayed before the options are present, and (b) shows a screen which presents a minimum size to which the size may be modified, and (c) shows a screen which presents a recommended frame type and a recommended widow size.

FIG. 12 is a diagram illustrating other examples of interface screens which may be used to present a designated target and options related to an attribute, wherein (a) shows a screen which is displayed before options are presented, and (b) shows a screen which presents a minimum size to which the size may be modified, and (c) shows a screen which presents a recommended frame type and a recommended widow size.

Also, in FIG. 12, only a query image display field 200A constituting the interface screen is shown.

By the way, the presentation example shown in FIG. 12 may be performed if a predetermined operation is performed in the state where the interface screen 210 (see FIG. 11) is displayed. However, display of the interface screen 210 is not essential.

In FIG. 12, the minimum size into which the window may be modified is smaller than the original size. Also, the recommended frame type is the balanced window type.

The display shown in FIG. 12 is an example of the assist information for assisting the modification.

Fourth Example

Figure 13:
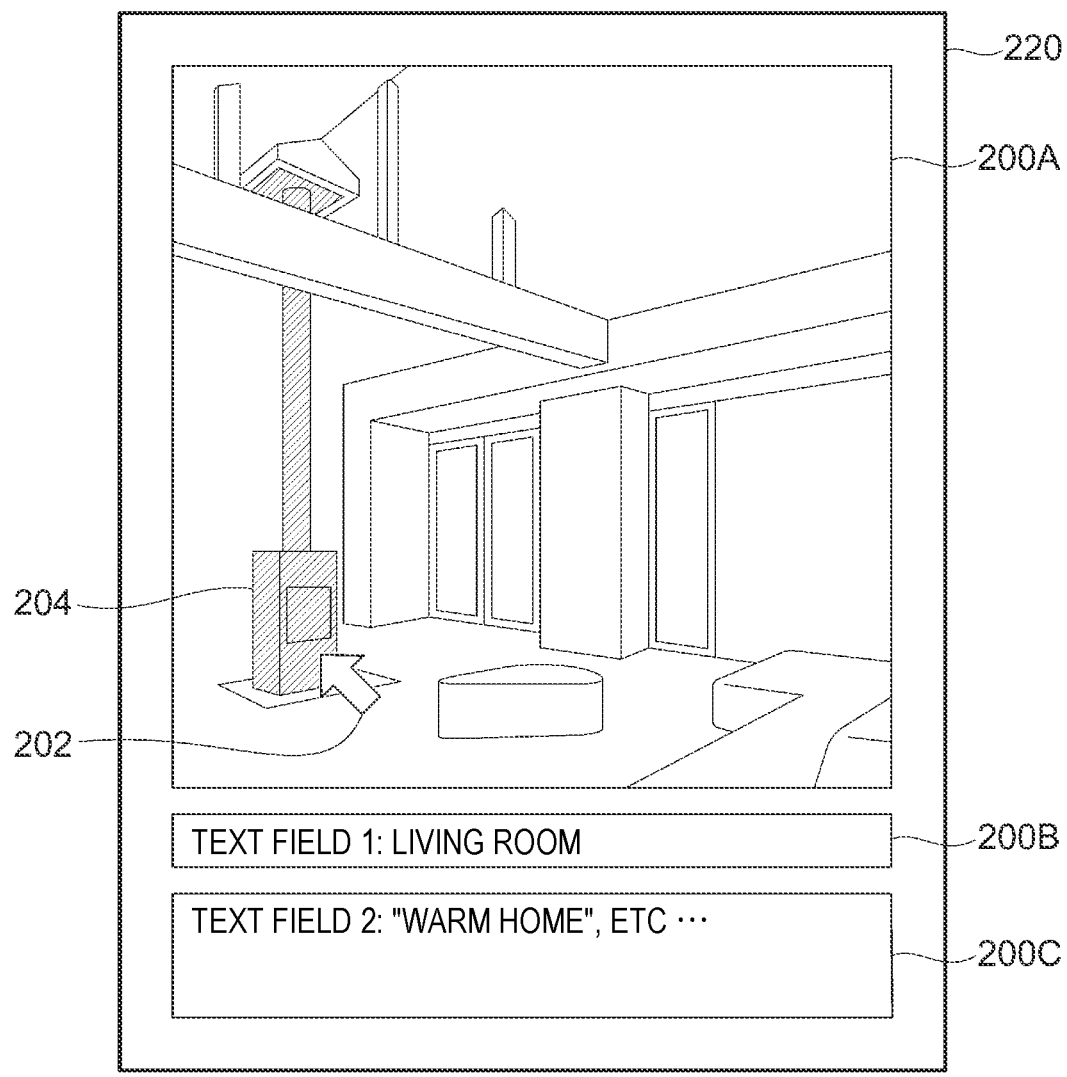
FIG. 13 is a diagram illustrating another example of interface screen used to designate a modification target.

FIG. 13 is a diagram illustrating another example of interface screens which may be used to designate a modification target.

In the case of an interface screen 220 shown in FIG. 13, as a query image display field 200A, a photograph of a lodge style living room is displayed. A query image 200 includes a wood-burning stove 204 and plural sofas.

The interface screen 220 shown in FIG. 13 also includes a text field 200B for inputting a structural information text, and a text field 200C for inputting an emotional information text. In FIG. 13, in the text field 200B, a text "Living Room" has been inputted, and in the text field 200C, a text "Warm Home" has been inputted.

Also, in FIG. 13, the black wood-burning stove 204 has been designated by a mouse pointer 202.

Fifth Example

Figure 14:
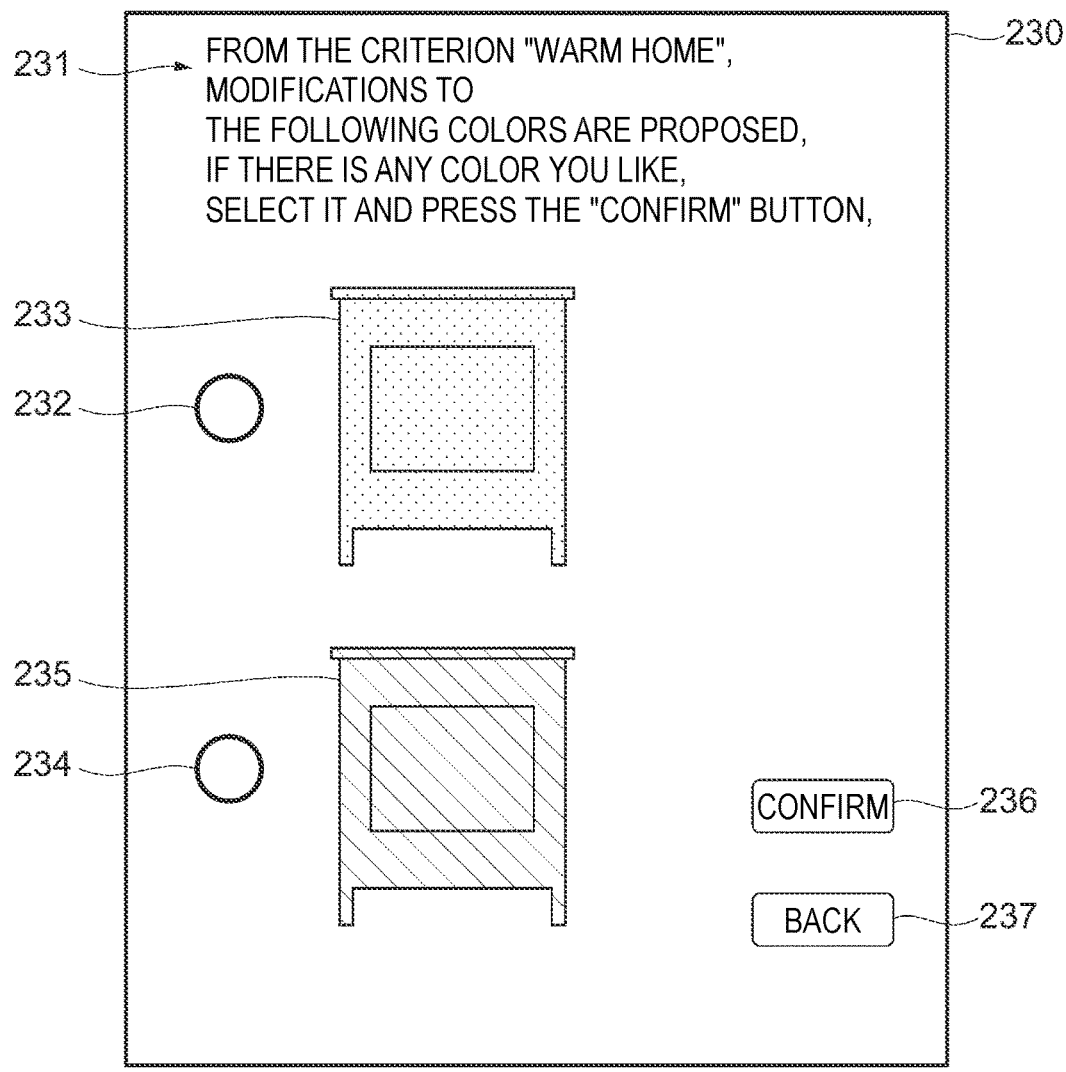
FIG. 14 is a view illustrating an example in which options corresponding to a modification target and based on an individual constraint are presented.

FIG. 14 is a view illustrating an example in which options corresponding to a modification target and based on individual constraints are presented. In FIG. 14, the modification target is the wood-burning stove 204. The color of the wood-burning stove 204 is black.

By the way, as described above, in the text field 200C (see FIG. 13), the information "Warm Home" has been inputted. Therefore, in an interface screen 230, a light-colored wood-burning stove is displayed as an option.

In FIG. 14, the interface screen 230 includes an explanatory text 231, radio buttons 232 and 234 usable to select options, option images 233 and 235, a "Confirm" button 236 usable to confirm a selection, and a "Return" button 237 usable to cancel a selection.

Also, as the explanatory text 231, information such as "From the criterion "Warm Home", modifies to the following colors are proposed. If there is any color you like, select it and press the "Confirm" button." is displayed.

Also, in the present exemplary embodiment, recommended wood-burning stoves are presented in consideration of procurement, cost, and other general constraints.

The display shown in FIG. 14 is an example of the assist information for assisting the modification.

Sixth Example

Figure 15A:
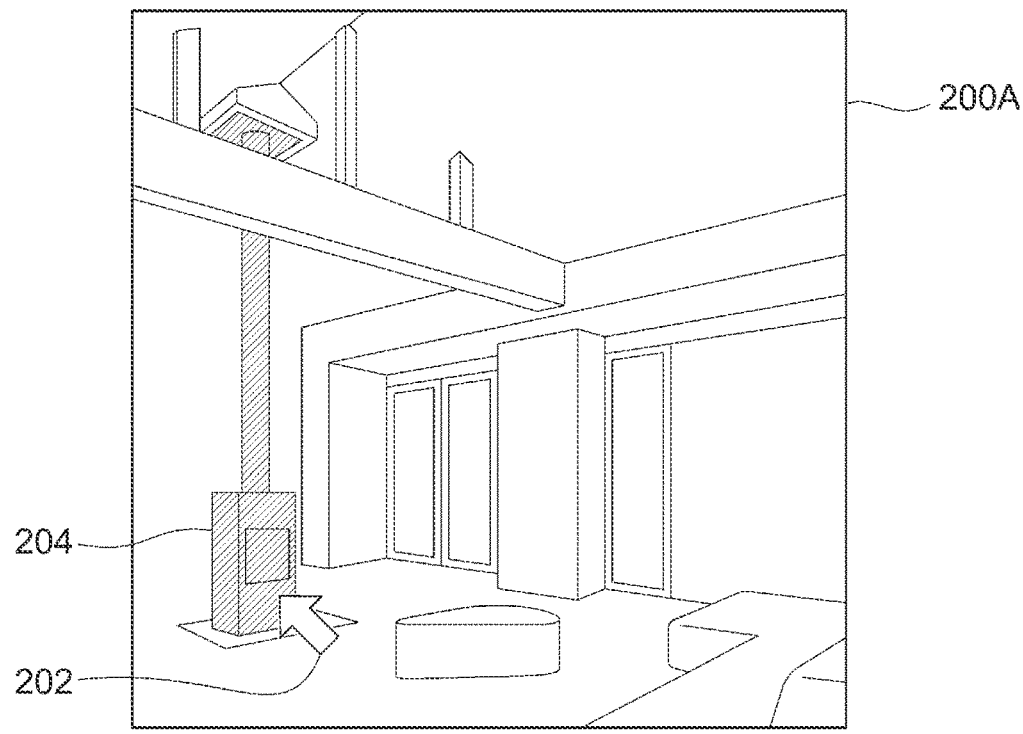
FIG. 15A is a view illustrating an example in which an option corresponding to a modification target and based on a general constraint is presented, and showing a state where a wood-burning stove in a query image has been designated.
Figure 15B:
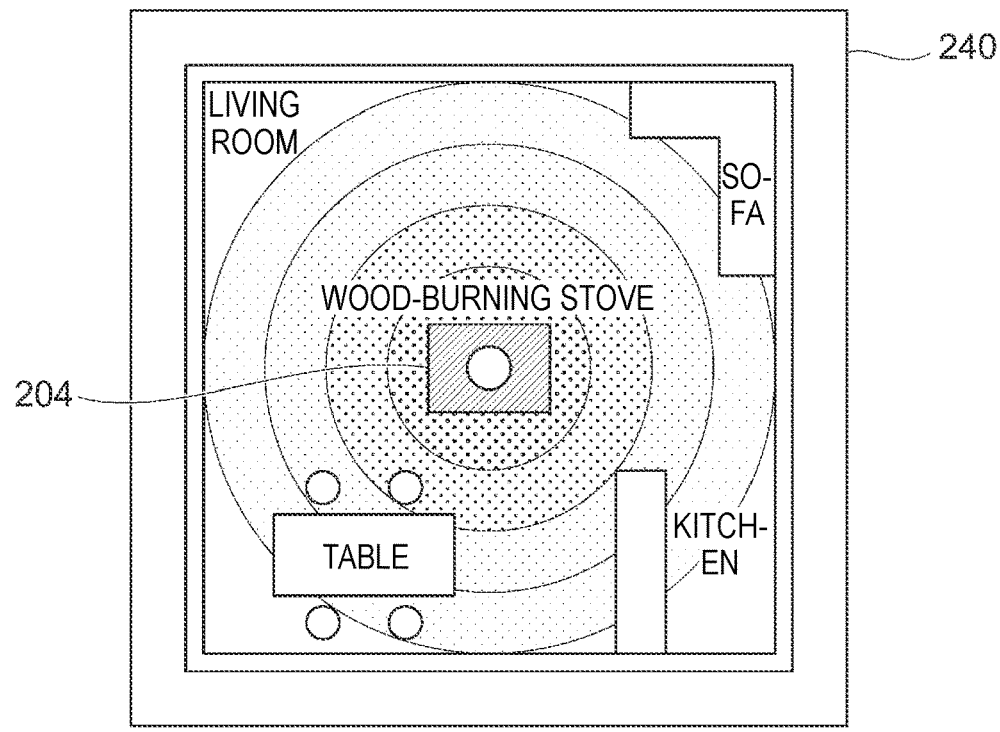
FIG. 15B is a view illustrating an example in which an option corresponding to a modification target and based on a general constraint is presented, in which the effects of the wood-burning stove on other articles existing in the same space are presented.

FIGS. 15A and 15B are views illustrating an example in which options corresponding to a modification target and based on general constraints are presented. FIG. 15A shows a state where the wood-burning stove 204 in the query image display field 200A has been designated, and FIG. 15B shows an example in which the effects of the wood-burning stove 204 on other articles existing in the same space are presented.

The content of the query image display field 200A is the same as the content of the query image display field 200A used in the interface screen 220 shown in FIG. 13. In other words, the query image display field 200A in FIG. 15A is the photograph of the living room.

An interface screen 240 shown in FIG. 15B shows a plan view of the living room having the wood-burning stove 204. Also, concentric circles having the wood-burning stove 204 as the center indicate the strengths of heat which is transmitted from the wood-burning stove 204 to the surroundings. It is represented by color tones that a higher temperature is transmitted to a zone closer to the center of the concentric circles and a lower temperature is transmitted to a zone closer to the periphery.

In FIGS. 15A and 15B, around the wood-burning stove 204, there are a sofa, a kitchen, and a table. The effect of heat from the wood-burning stove 204 decreases in order of the table, the kitchen, and the sofa. This display makes the user recognize the necessity of changing the arrangement of other articles placed around the wood-burning stove. Also, this display may be used to modify the arrangement of the sofa, the kitchen, and so on.

The displays shown in FIGS. 15A and 15B are examples of assist information for assisting the modification.

Figure 16A:
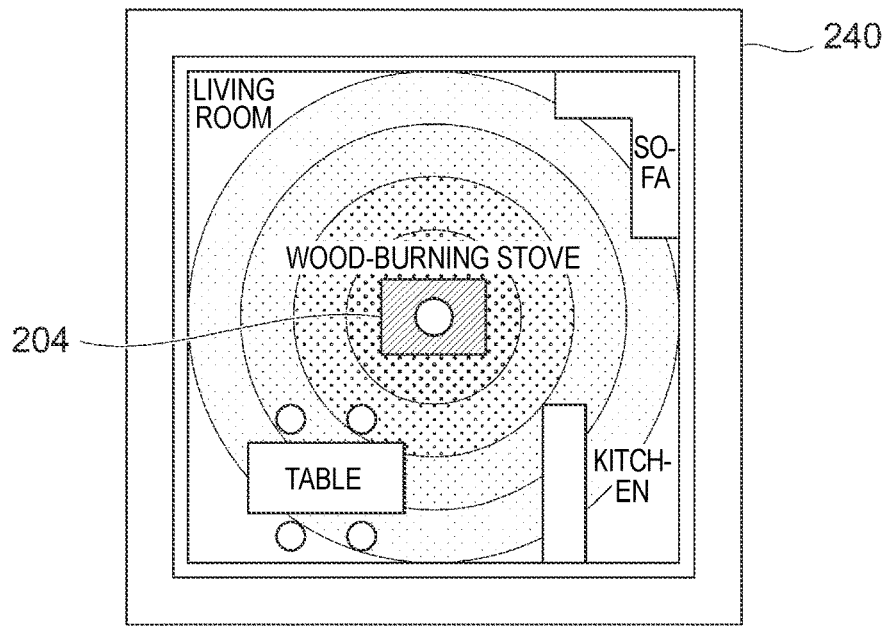
FIGS. 16A and 16B are diagrams illustrating an example in which options based on local rules as examples of general constraints are presented.
Figure 16B:
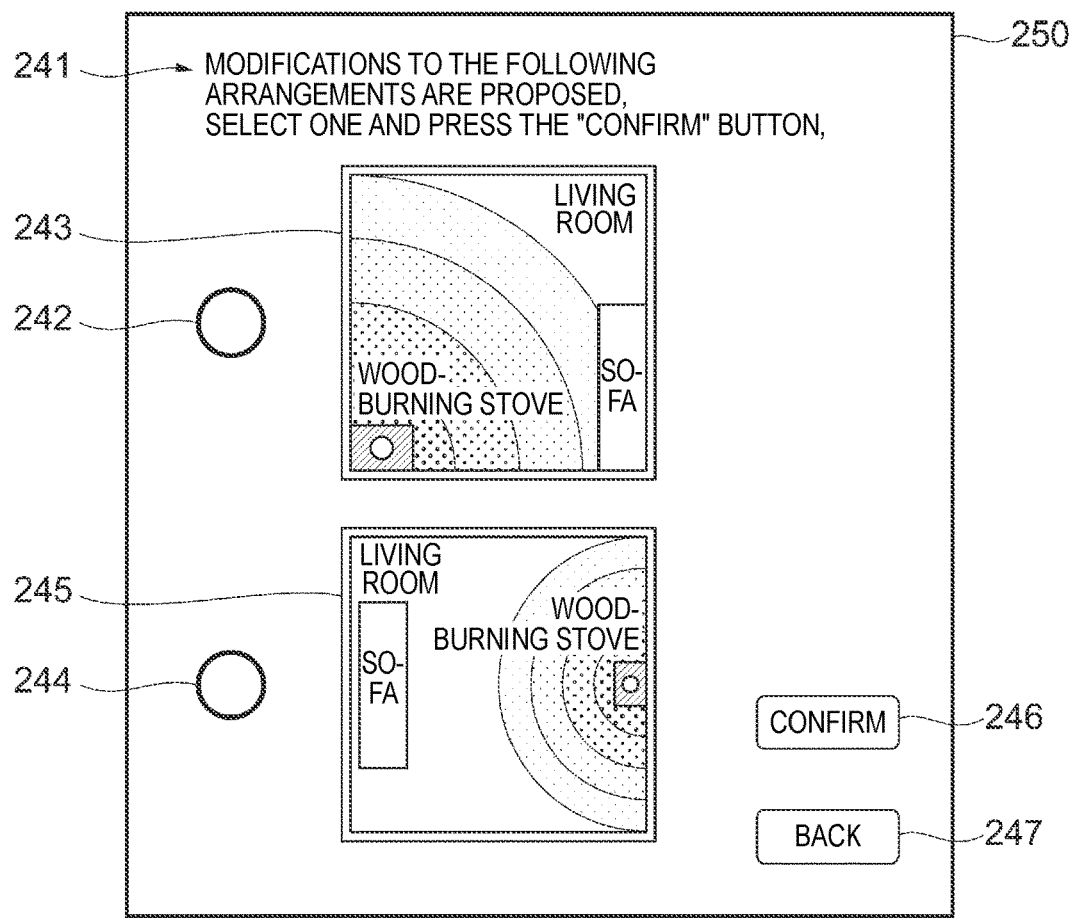

FIGS. 16A and 16B are views illustrating an example in which options based on local rules which are examples of general constraints are presented.

An interface screen 250 shown in FIG. 16B is an example of display of options in the case where three installation location candidates for the wood-burning stove 204 has been found from cases stored in the company.

One of the three candidates is a layout in which the wood-burning stove 204 is disposed at the center of the living room. By the way, this layout is shown in the query image selected by the user.

Therefore, in the interface screen 250, the other two installation locations are displayed as options.

One of the options is a layout 243 in which the wood-burning stove 204 is disposed at a corner of the living room. Near the layout 243, a radio button 242 for selection is displayed.

The other one of the options is a layout 245 in which the wood-burning stove 204 is disposed against the center of a wall. Also, near the layout 245, a radio button 244 for selection is displayed.

Further, the interface screen 250 includes an explanatory text 241, a "Confirm" button 246 usable to confirm a selection, and a "Return" button 247 usable to cancel a selection.

The displays shown in FIGS. 16A and 16B are examples of assist information for assisting the modification.

By the way, the disposition of the wood-burning stove 204 is related to constraints such as the Building Standards Act, the Fire Prevention Act, etc.

Figure 17A:
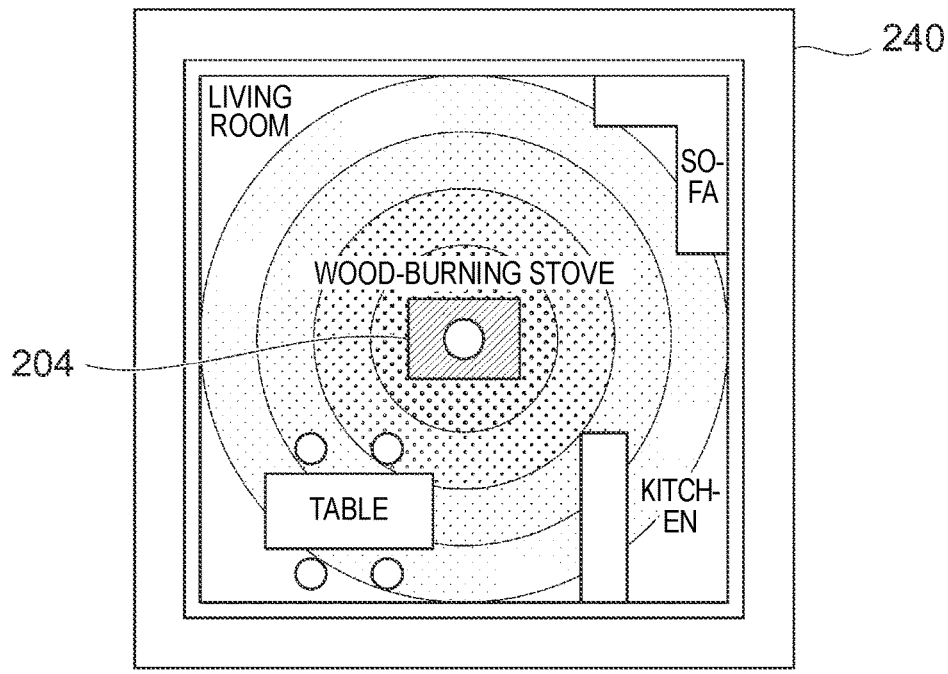
FIGS. 17A and 17B are views illustrating an example of screens which present constraints based on the Fire Prevention Act as examples of general constraints.
Figure 17B:
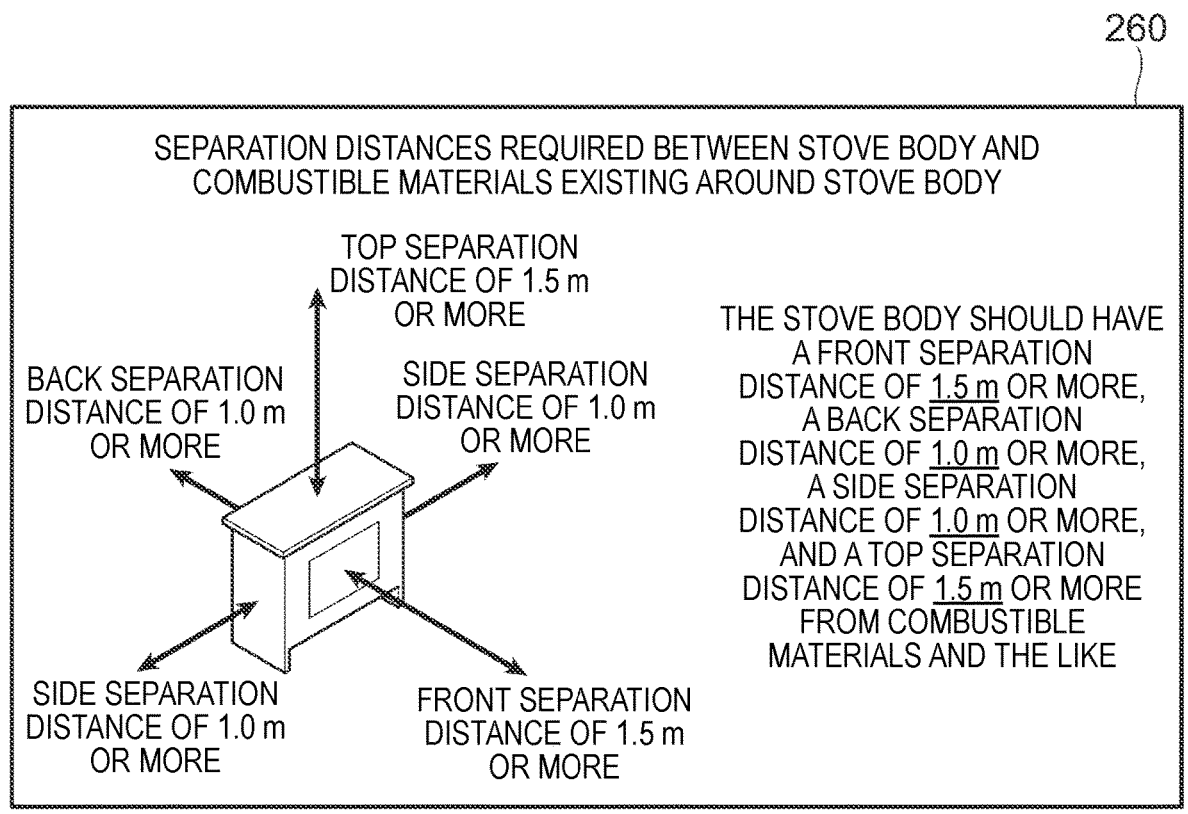

FIGS. 17A and 17B are views illustrating an example of a screen which presents constraints based on the Fire Prevention Act which are examples of general constraints to the user.

In an interface screen 260 shown in FIG. 17B, separation distances required between the stove body and combustible materials around the stove body are represented by a schematic diagram. This interface screen 260 is also an example of information to assist in changing.

In FIGS. 17A and 17B, it has been determined that from combustible materials and the like, the stove body should have a front separation distance of 1.5 m or more, a back separation distance of 1.0 m or more, a side separation distance of 1.0 m or more, and a top separation distance of 1.5 m or more.

The display of the interface screen 260 makes it easier to grasp relations required between the wood-burning stove 204 and articles existing around the stove, as compared to the case where the relations with other articles are presented in a text-based form such as the form of a chart.

Figure 18:
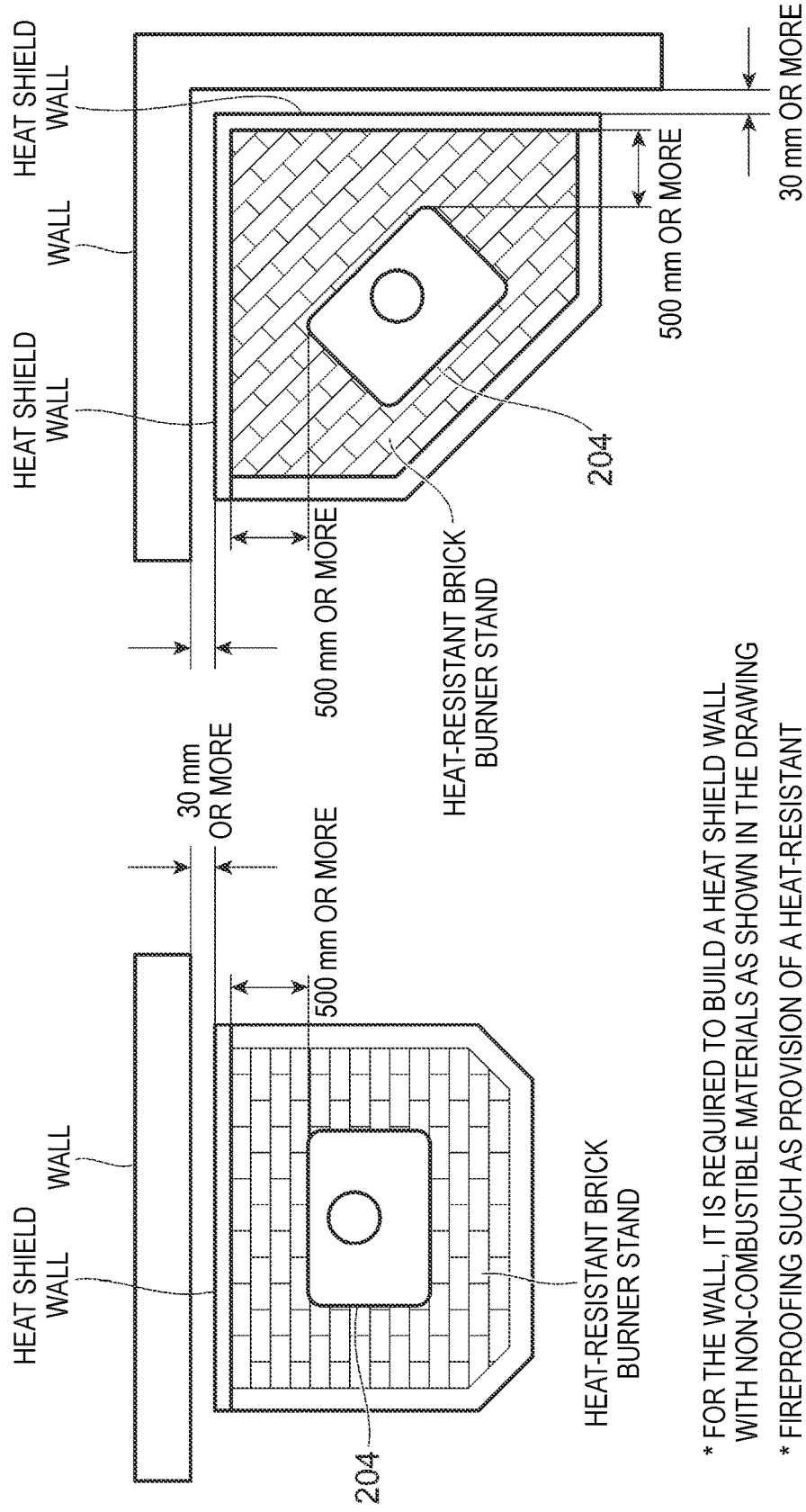
FIG. 18 is a view illustrating another example of a screen which presents constraints based on the Fire Prevention Act as examples of general constraints.

FIG. 18 is a view illustrating another example of a screen which presents constraints based on the Fire Prevention Act which are examples of general constraints.

The example shown in FIG. 18 represents specifications which are required from the Fire Prevention Ordinance and the like in the case of installing the wood-burning stove 204 at a corner of the living room or against the wall.

In the example of FIG. 18, it is shown that it is required to provide a gap of 30 mm or more between the wall and the heat shield wall and it is required to provide a gap of 500 mm or more between the wood-burning stove 204 and the heat shield wall. For the heat shield wall, refractory bricks and so on which are non-combustible materials may be used.

Also, it is shown that fireproofing such as provision of a heat-resistant burner stand is required under the wood-burning stove 204.

In the display shown in FIG. 18, the relations between the wood-burning stove 204 designated as a target by the user and articles around the wood-burning stove are expressed graphically. Therefore, it is easier to grasp the required specifications as compared to the case where the relations between them are presented in a text-based form, for example, the form of a chart. The display shown in FIG. 18 is an example of information to assist in changing.

Seventh Example

FIG. 19 is a table illustrating an example of an interface screen 270 which may be used to present a designated target and modification options related to an attribute.

The table shown in FIG. 19 represents the case where the modification target is a stove in a living room.

In the case of FIG. 19, the modification target is shown in a "Selected Parts" field 271. For attributes to be modified, a "Deletion" field 272 and a "Modifiable Attribute" field 273 are provided.

Of them, the "Deletion" field 272 includes a "Possibility" field and a "Reason" field. In the case of FIG. 19, deletion of the stove is "possible".

Further, in the "Reason" field, information "The stove is not essential, and there are substitutable heating means such as floor heating systems and air conditioners." is displayed.

The "Modifiable Attribute" field 273 includes an "Attribute Name" field, a "Range (Upper Limit/Lower Limit)" field, a "Reason" field, a "Recommendation" field, and another "Reason" field.

In FIG. 19, as examples of attribute names, "Position", "Brand", "Size", and "Color" are shown.

Hereinafter, the contents described with respect to the individual items shown in the "Attribute Name" field will be described.

(Position)

In the case of FIG. 19, in the "Range (Upper Limit/Lower Limit)" field, information such as "Front Separation Distance of 1.5 m or more", "Back Separation Distance of 1.0 m or more", "Side Separation Distance of 1.0 m or more", and "Top Separation Distance of 1.5 m or more" are shown.

In the "Reason" field, as the reason why the modification range is limited, information "Fire Prevention Ordinance" is shown.

In the "Recommendation" field, information "It is recommended to install the stove against the wall or at a corner so as to have a front separation distance of a3 m or more, a back separation distance of b3 m or more, a side separation distance of c3 m or more, and a top separation distance of d3 m or more." is shown.

In the "Reason" field, the reason of the recommendation such as "It is desired to make a modification to the example in which the stove is installed at the center of the living room, and other in-house cases have been extracted." is shown.

An example of the above-mentioned recommendation is the interface screen 250 (see FIG. 16B).

(Brand)

In FIG. 19, in the "Range (Upper Limit/Lower Limit)" field, information such as "Arbitrary" is shown.

In the "Reason" field, as the reason why the modification range is limited, information "None in particular" is shown.

In the "Recommendation" field, information "Brand X, Brand Y, Brand Z" is shown.

In the case of this example, in the "Reason" field, the reason of the recommendation such as "The brands X, Y, and Z are recommended since they are procurable brands, and satisfy the desire "Warm Home"." is shown.

(Size)

In FIG. 19, in the "Range (Upper Limit/Lower Limit)" field, information such as "Arbitrary" is shown.

In the "Reason" field, as the reason why the modification range is limited, information "None in particular" is shown.

In the "Recommendation" field, "M Size" is shown.

In the "Reason" field, the reason of the recommendation such as "The M size is the size most frequently used in achievements." is shown.

(Color)

In FIG. 19, in the "Range (Upper Limit/Lower Limit)" field, information such as "Arbitrary" is shown.

In the "Reason" field, as the reason why the modification range is limited, information "None in particular" is shown.

In the "Recommendation" field, information "Light Colors" is shown.

In the "Reason" field, the reason of the recommendation such as "Since light colors satisfy the desire "Warm Home", light colors are recommended." is shown.

The display shown in FIG. 19 is also an example of the assist information to assist in modification.

OTHER EMBODIMENTS

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

In the above-described exemplary embodiment, the image search system intended for use in architect offices and design offices has been described as an example. However, the field in which image search systems for inputting query images and text information may be used is not limited to the construction field. For example, the exemplary embodiments of the invention may also be applied in web search or document search.

In the above-described exemplary embodiment, in the case where a window is designated as a modification target, constraints related to modification of the window are determined in consideration of the relation with a living room where the window will be installed. However, constraints related to modification of the window may be determined in consideration of the relation with a wall where the window will be installed. In other words, modification conditions do not necessarily need to be determined on the basis of the relation between a modification target and a space or place where the corresponding target will be installed, and may be determined on the basis of the relation between a modification target and a member or a position where the modification target will be installed. Also, the relation between the wood-burning stove 204 and the floor and the relation between the wood-burning stove 204 and the wall are examples of the relation between a modification target and a member or position where the modification target will be installed.

The relation between a window and a wall and so on also are examples of the relation between a modification target and another article.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be modified.

What is claimed is:

1. A query modification assistance system comprising:
a processor configured to:
present, in response to at least a part of an image used as a query that is to be provided to a search engine being designated by a user as a target to be modified, assist information for assisting a modification according to at least one search condition relating to the target, to the user,
wherein the assist information is information for assisting the user such that the image after the modification does not contradict or violate the at least one search condition, the at least one search condition being a condition that is satisfied by the image before the modification; and
search the at least one search condition relating to the target from a database and an input of the user.

2. The query modification assistance system according to claim 1, wherein
the at least one search condition includes a condition determined based on a relation with the target and a place where the target is provided.

3. The query modification assistance system according to claim 2, wherein
the processor presents a locational range in which the target is arrangeable.

4. The query modification assistance system according to claim 3, wherein
the processor presents a recommended location for the target.

5. The query modification assistance system according to claim 3, wherein
the at least one search condition includes a condition determined based on a relation between the target and another article shown in the image in which the target is shown, the another article being different from the target.

6. The query modification assistance system according to claim 5, wherein
   the processor further presents information about the another articles to be influenced by the modification.

7. The query modification assistance system according to claim 2, wherein
   the processor presents a variable range of the size of the target.

8. The query modification assistance system according to claim 7, wherein
   the processor presents a recommended size for the target.

9. The query modification assistance system according to claim 1, wherein
   the at least one search condition is determined for each target.

10. The query modification assistance system according to claim 9, wherein
    the processor presents a recommended modification for the target.

11. The query modification assistance system according to claim 1, wherein
    the at least one search condition includes a condition designated by a service provider of the search engine.

12. The query modification assistance system according to claim 1, wherein
    the at least one search condition includes a condition determined based on a query inputted by the user.

13. The query modification assistance system according to claim 1, wherein
    the processor presents a content of the at least one condition as the assist information.

14. A non-transitory computer readable medium storing a program to execute a computer to perform a process comprising:
    presenting, in response to at least a part of an image used as a query that is to be provided to a search engine being designated by a user as a target to be modified, assist information for assisting a modification according to at least one condition relating to the target, to a user,
        wherein the assist information is information for assisting the user such that the image after the modification does not contradict or violate the at least one search condition, the at least one search condition being a condition that is satisfied by the image before the modification; and
    searching the at least one search condition relating to the target from a database and an input of the user.

* * * * *